(12) United States Patent
Lipton et al.

(10) Patent No.: US 9,223,631 B2
(45) Date of Patent: Dec. 29, 2015

(54) PERFORMING AN OPERATION USING MULTIPLE SERVICES

(75) Inventors: Daniel Lipton, Belmont, CA (US); Vladimir Lhotak, San Jose, CA (US)

(73) Assignee: APPLE INC., Cupertino, CA (US)

( * ) Notice: Subject to any disclaimer, the term of this patent is extended or adjusted under 35 U.S.C. 154(b) by 417 days.

(21) Appl. No.: 13/050,904

(22) Filed: Mar. 17, 2011

(65) Prior Publication Data

US 2012/0240124 A1    Sep. 20, 2012

(51) Int. Cl.
*G06F 9/46* (2006.01)
*G06F 9/50* (2006.01)

(52) U.S. Cl.
CPC ...... *G06F 9/5066* (2013.01); *G06F 2209/5017* (2013.01)

(58) Field of Classification Search
None
See application file for complete search history.

(56) References Cited

U.S. PATENT DOCUMENTS

| | | | |
|---|---|---|---|
| 7,577,959 B2 | 8/2009 | Nguyen et al. | |
| 7,669,130 B2 | 2/2010 | Agarwal et al. | |
| 7,720,349 B2 * | 5/2010 | Ogikubo | 386/278 |
| 2006/0212334 A1 | 9/2006 | Jackson | |
| 2006/0225074 A1 * | 10/2006 | Vaid et al. | 718/102 |
| 2009/0125911 A1 * | 5/2009 | Lazarus | 718/104 |
| 2009/0248754 A1 * | 10/2009 | Lipton et al. | 718/102 |
| 2011/0016214 A1 | 1/2011 | Jackson | |
| 2011/0078303 A1 * | 3/2011 | Li et al. | 709/224 |
| 2011/0093852 A1 * | 4/2011 | Li et al. | 718/100 |

OTHER PUBLICATIONS

Abraham, Linton, et al., "Self-Provisioned Hybrid Clouds," Proceeding of the 7th IEEE International Conference on Autonomic Computing (ICAC '10), Jun. 2010, 10 pages, ACM, New York, NY.

* cited by examiner

*Primary Examiner* — Sisley Kim
(74) *Attorney, Agent, or Firm* — Adeli LLP

(57) ABSTRACT

Some embodiments provide a method for distributing an operation for processing by a set of background services. The method automatically determines a number of background services for performing an operation. The method partitions the operation into several sub-operations. The method distributes the several sub-operations across the determined number of background services.

20 Claims, 20 Drawing Sheets

*Figure 4*

| Parameter 1 | Parameter 2 | Parameter 3 | Service Configuration |
|---|---|---|---|
| 1 | Y | $x_0 - x_1$ | A |
| | | $x_1 - x_2$ | B |
| | | ⋮ | C |
| | | $x_{n-1} - x_n$ | D |
| | N | $x_0 - x_1$ | B |
| | | $x_1 - x_2$ | D |
| | | ⋮ | E |
| | | $x_{n-1} - x_n$ | A |
| 2 | Y | $x_0 - x_1$ | C |
| | | $x_1 - x_2$ | D |
| | | ⋮ | E |
| | | $x_{n-1} - x_n$ | F |
| | N | $x_0 - x_1$ | A |
| | | $x_1 - x_2$ | B |
| | | ⋮ | D |
| | | $x_{n-1} - x_n$ | E |

PERFORMING AN OPERATION USING MULTIPLE SERVICES

BACKGROUND

A computer cluster is a group of physical electronic devices (e.g., computing devices) that are commonly connected through a network connection (e.g., local area network). The group of electronic devices is linked together to improve performance over that of a single electronic device by sharing computational workload among multiple electronic devices. By coupling two or more physical electronic devices through a network, a user may take advantage of the parallel processing power of the electronic devices. The parallel processing power of a computer cluster is typically more cost effective than a mainframe (single large source of processing power) with similar power.

Virtualization provides the means for partitioning hardware resources that makes it seem as if each of multiple services running on an electronic device is individually hosted on a separate electronic device. With the advent of virtualization technology, a user may set up an electronic device so that multiple virtual machines or multiple instantiations of the same application or service run simultaneously on the single electronic device. While a computer cluster has multiple physical electronic devices linked together to perform parallel processing, a virtual cluster on a single electronic device has multiple services performing operations simultaneously on the single device.

Certain operations (e.g., encoding operations) are not threaded in a manner that inherently takes advantage of all the computing resources of an electronic device. For example, a single instance of a particular operation might only be able to use one or two cores of a multi-core processor because of the way its processes are threaded. A single-threaded operation, for instance, can generally only utilize one core.

FIG. 1 illustrates an example of a service that uses only a portion of the available computing resources. In this example, the service 105 uses two cores 110 and 115 out of eight-cores in an eight-core processor 120 that is part of an electronic device to process an operation. In order to make use of the available resources, a user of the electronic device may manually increase the number of services for the services to process portions of the operation simultaneously, thereby making use of the available resources and increasing the efficiency in processing the operation.

However, in order for a user of an electronic device to improve the performance of an operation, not only must the user understand that not all of the available computing resources are being utilized in processing the operation, but the user must also be able to determine the number of services to run to improve the performance of the operation (e.g., to maximally utilize the available resources and increase the processing speed). Users are often unfamiliar with the underlying mechanics of their computer systems, which makes it difficult for the users to determine the number of instances to create to maximize performance in processing a particular operation.

BRIEF SUMMARY

Some embodiments of the invention provide a method that automatically determines a service configuration for performing an operation (e.g., media encoding, media decoding, printing, etc.) on an electronic device in order to maximize the performance of the operation. The service configuration of some embodiments identifies the number of services (e.g., instances of a particular service daemon) for a system to operate in performing the operation.

The method of some embodiments determines a service configuration for an operation by mapping a set of parameters (e.g., operation parameters that describe the operation and hardware configuration parameters that describe the device performing the operation) to a particular service configuration in a service configuration table. In some embodiments, the service configuration from the service configuration table specifies a set of values from which the method can calculate a number of instances to instantiate.

For example, the service configuration table of some embodiments specifies a number of processor cores utilized by each instantiation of a service and a maximum number of services that can be instantiated. Based on these service configuration values and the actual number of cores of the device, the method of some embodiments calculates a number of services to instantiate to perform the operation. Upon the determination of a service configuration, some embodiments may split the operation into multiple sub-operations and distribute the sub-operations to each of the services for simultaneous processing.

In some embodiments, the service configuration table is a table that is hardcoded into an electronic device. The method of some embodiments may further adapt the service configuration table to a particular electronic device in order to run the number of services for each operation that would provide the best performance on that particular device. Some embodiments adapt the service configuration table by analyzing historical performances of similar operations on the particular device. For example, if performing a previous similar operation used a small portion of the available resources, then the system may increase the number of services to better utilize the available resources for increased performance. As the system performs additional similar operations, the system may fine-tune the service configuration table to arrive at the best settings for quality and performance.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 4 conceptually illustrates an example of a service configuration table of some embodiments from which a system may determine a service configuration for a particular operation.

DETAILED DESCRIPTION

Figure 1:
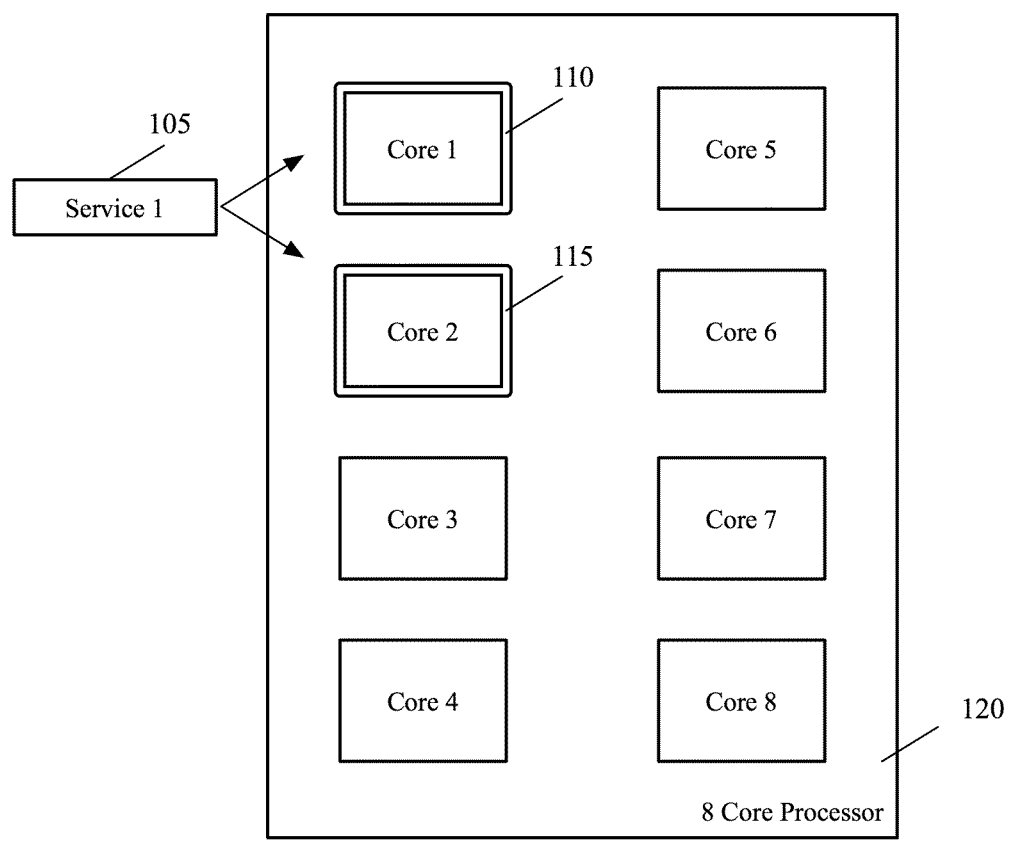
FIG. 1 illustrates an example of a service that uses only a portion of the available computing resources.

In the following description, numerous details, examples and embodiments are set forth for purpose of explanation. However, one of ordinary skill in the art will realize that the invention is not limited to the embodiments set forth and that the invention may be practiced without some of the specific details and examples discussed. In other instances, well-known structures and devices are shown in block diagram form in order not to obscure the description of the invention with unnecessary detail.

Some embodiments of the invention provide a method that automatically determines a service configuration for performing an operation (e.g., media encoding, media decoding, printing, etc.) on an electronic device in order to maximize the performance of the operation. The service configuration of some embodiments identifies the number of services (e.g., instances of a particular service daemon) for a system to operate in performing the operation.

Services (i.e., daemons) are programs that run in the background of the system of an electronic device and provide a function (e.g., printing, web access, e-mail, data compression, etc.) to the system. In some embodiments, a service receives an operation (e.g., a video/audio encoding project, data compression task, etc.) and performs data format conversion from one format to another. For instance, a service of some embodiments may convert video data from DV to H.264, from uncompressed QuickTime to MPEG-4, etc. The compressord daemon is one example of a service that performs such data conversion tasks.

In some embodiments, the electronic device on which the services run may be a server, personal computer, laptop computer, desktop computer, tablet computer, mobile phone, smartphone, media player, personal digital assistant, any type of a computing device, etc. An electronic device has a finite amount of hardware resources (e.g., computing resources such as physical memory, processing speed, etc.). The method of some embodiments uses as much of the available hardware resources as practicable when performing a particular operation (e.g., video encoding). This may be all of a particular resource (e.g., all processor cores of a multi-core processor) or only a portion of the particular resource (e.g., only half or three-fourths of the processor cores).

In some embodiments, a particular service (e.g., an instance of compressord) uses only a particular quantity of the available hardware resources when performing an operation on a device. To take advantage of the available resources (e.g., all or most of the cores in a multi-core processor), the method of some embodiments may automatically launch (i.e., instantiate) additional services that use the available hardware resources to assist in performing the operation (e.g., by dividing the work among the multiple services). Some embodiments may split the operation into multiple sub-operations and then distribute the sub-operations to each of the services for simultaneous processing.

Figure 2:
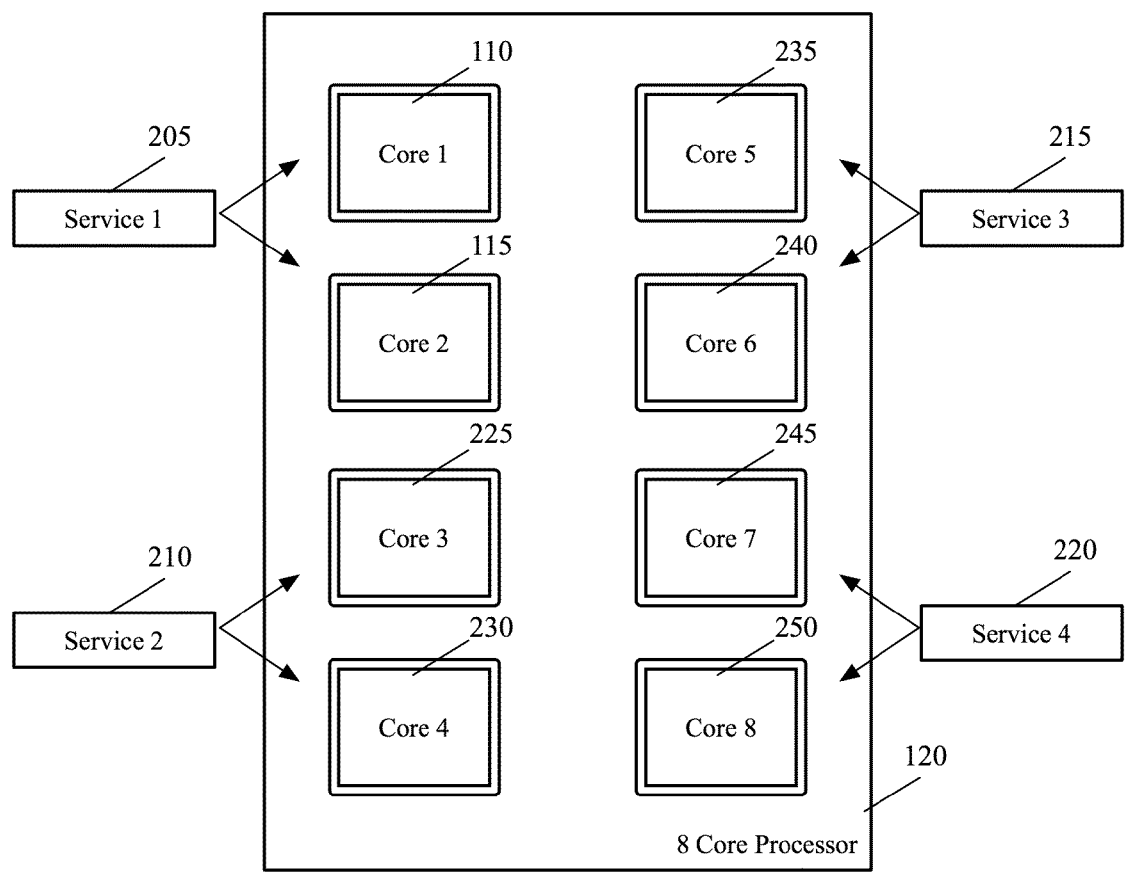
FIG. 2 illustrates an example of the utilization of the available hardware resources by instantiating multiple services.

FIG. 2 illustrates an example of the utilization of the available hardware resources by instantiating multiple services. In this example, four services 205-220 operate in parallel to utilize all eight cores 110, 115, and 225-250 of the processor 120 in performing a particular operation (e.g., an encoding operation). In this example, all cores of the processor 120 are in use, thereby maximizing the performance of the device (i.e., fully utilizing the processing capability of the device) in performing the particular operation. This will enable the electronic device containing processor 120 to perform the particular operation significantly faster than in the situation shown in FIG. 1.

Figure 3:
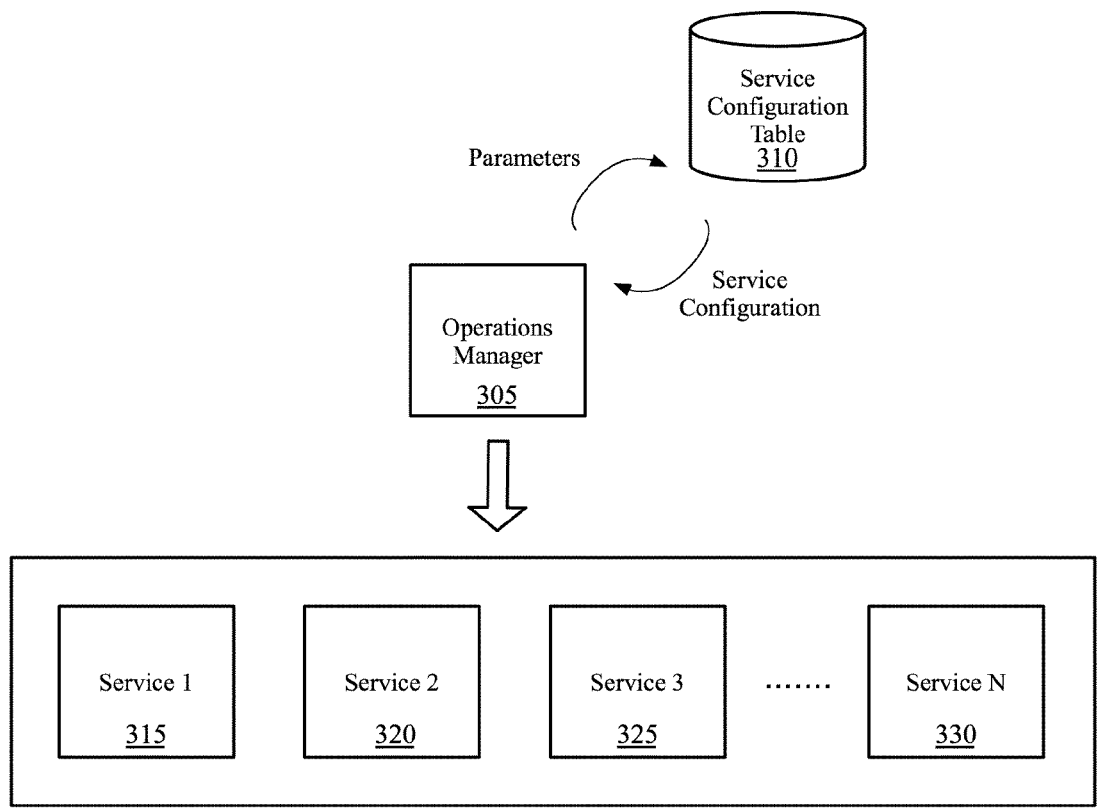
FIG. 3 conceptually illustrates an example of some embodiments of the instantiation of a service configuration (i.e., a number of services) determined from a service configuration table.

Some embodiments automatically instantiate the services (e.g., the four services 205-220) when a user initiates the performance of a particular type of operation. FIG. 3 conceptually illustrates an example of some embodiments of the instantiation of a service configuration (i.e., a number of services) determined from a service configuration table. FIG. 3 will be described by reference to FIG. 4, which conceptually illustrates an example of a service configuration table of some embodiments from which a system may determine a service configuration for a particular operation. Some embodiments determine the service configuration or a number of services to instantiate for a particular operation by mapping a set of parameters (e.g., operation parameters that describe the operation and hardware configuration parameters that describe the device performing the operation) to a particular service configuration in the service configuration table. Once the system determines the service configuration and instantiates the services, some embodiments partition the operation into multiple sub-operations and distribute the sub-operations to the instantiated services for simultaneous processing.

FIG. 3 illustrates an operations manager 305 that determines a service configuration (e.g., number of services) for an operation by mapping a set of parameters (e.g., operation parameters of the operation, hardware configuration of the device on which the services will run) to the corresponding service configuration in a service configuration table 310. As shown, when the operations manager 305 receives the service configuration from the service configuration table 310, the operations manager 305 instantiates the services 315-330 according to the received service configuration. These services, in some embodiments, are each separate instantiations of the same service (e.g., the compressord daemon).

In some embodiments, the service configuration table 310 is a hardcoded table (i.e., a lookup table) that outputs a service configuration based on a set of input parameters. The input parameters may include operation parameters that describe the operation to be performed (e.g., source codec and output settings of an encoding task) and/or hardware resource parameters describing the device performing the operation (e.g., number of cores and amount of physical memory). When a machine is located in a cluster (e.g., connected through a network in such a way as to be able to share computing resources), some embodiments may analyze the hardware resources of some or all of the available machines in the cluster and then split the operation among these multiple machines (possibly instantiating multiple services on more than one of the machines).

FIG. 4 conceptually illustrates an example of a service configuration table 400 from which the operations manager 305 may obtain a service configuration for an operation. The service configuration table 400 in FIG. 4 enables the operations manager 305 to map a set of parameters 405-415 to a service configuration 420. As shown, the parameters may be of different types—in this case, the first parameter is an integer value, the second parameter is a Boolean (yes/no) value, and the third parameter is a range. As an example, the first parameter 405 might be the number of cores of the device, the second parameter 410 the hyperthread-capability of the device, and the third parameter 415 the amount of physical RAM on the device. One of ordinary skill in the art will recognize that the service configuration table of some embodiments will have more parameters (e.g., the processing speed) and more possible values for some of the parameters (e.g., 4 cores, 8 cores, 16 cores, etc.) than are shown in this example. In addition, the parameters may describe the operation to perform rather than the hardware resources of the device. For instance, for an encoding (or transcoding) operation, the table may be indexed by the source format (e.g., MPEG-4 file, QuickTime movie file, etc.), destination format (e.g., MPEG-4 file, QuickTime movie file, etc.), or compression technique (e.g., H.264, MPEG-4) of the operation.

The service configuration column 420 in FIG. 4 provides a number in each entry that indicates the number of services for a system to run that would give the best performance (e.g., fastest processing speed with the best results) in performing a particular operation. In some embodiments, the number of services may range from 1 to a finite integer. In this example, the number of services ranges from A to F, where each symbol represents a particular number. In some embodiments, the service configuration for a particular set of parameters is determined by developers of the application (e.g., operating system, media-editing application, etc.) that includes the service configuration table.

In some embodiments, the service configuration column provides a set of values in each entry. For instance, each entry under the service configuration column may provide the service's core utilization (which indicates the number of cores each service would use) for performing the operation and a maximum number of services to instantiate. Based on these service configuration values and the actual number of cores of the device, the method of some embodiments calculates a number of services to instantiate to perform the operation. In some embodiments, the method may additionally adjust the number of services by checking additional hardware resources to determine whether these resources can accommodate that many services (e.g., ensuring that enough physical RAM is available for all of the services to operate without thrashing).

As mentioned, in FIG. 3 the operations manager 305 determines the number of services for the particular operation using the service configuration table 310 and instantiates the determined number of services 315-330. As shown in this example, the operations manager 305 instantiates N services 315-330, which may now streamline the performance of the operation to accelerate completion. These services 315-330 may be instantiated on a single electronic device or across multiple devices that are coupled through a network.

The operations manager 305 of some embodiments may streamline the performance of the operation by dividing the operation into multiple sub-operations and then distributing each of the sub-operations to the services for processing. In some embodiments, the operations manager 305 communicates with one of the instantiated services (e.g., service 315) to determine the number of sub-operations into which to divide the operation. Some embodiments divide the operation into the same number of sub-operations as the number of instantiated services, or a multiple of the number of instantiated services (e.g., twice, three times). The number of sub-operations may differ depending on the type of operation in some embodiments.

Some embodiments enable a user of the device to specify (e.g., through a preference setting of a media-editing application or the operating system) whether the device may automatically instantiate additional services. In some embodiments, the user may restrict the performance of operations to use only one service (e.g., multi-pass encoding, which requires analysis of the entirety of the data to be encoded, and thus cannot be easily split into sub-operations), because in some cases segmenting an operation into multiple sub-operations (i.e., for multiple services to process) may degrade the quality of the end result.

As mentioned, in some embodiments the service configuration table is a table that is hardcoded into an electronic device. The method of some embodiments may further adapt the service configuration table to a particular electronic device in order to run the number of services for each operation that would provide the best performance on that particular device. Some embodiments adapt the service configuration table by analyzing historical performances of similar operations on the particular device. For example, if performing a previous similar operation used a small portion of the available resources, then the system may increase the number of services to better utilize the available resources for increased performance. As the system performs additional similar operations, the system may fine-tune the service configuration table to arrive at the best settings for quality and performance.

FIGS. 2-4 illustrate one example of the instantiation of multiple services on an electronic device for the performance of an operation that would maximally utilize the available hardware resources on the device. Several more detailed embodiments are described below. Section I describes the determination of a service configuration for performing an operation. Section II describes the performance of multiple operations. Next, Section III describes the determination of a service configuration in an adaptive model. Section IV then describes the software architecture of a system of some embodiments. Finally, Section V describes an electronic system with which some embodiments of the invention are implemented.

I. Determination of a Service Configuration

As mentioned above, some embodiments determine a service configuration that would provide the best performance in performing an operation. In some embodiments, the service configuration specifies the number of services for performing an operation that would maximally utilize the available hardware resources on an electronic device upon which the operation is performed, thereby maximizing the efficiency in performing the operation. Some embodiments determine the service configuration for an operation by performing a mapping function on a lookup table. Different embodiments may determine the service configuration for performing different operations differently, such as by individually assessing each operation (e.g., using an algorithm that analyzes the properties of each operation as well as machine performance to come up with the appropriate number of services for each operation).

Figure 5:
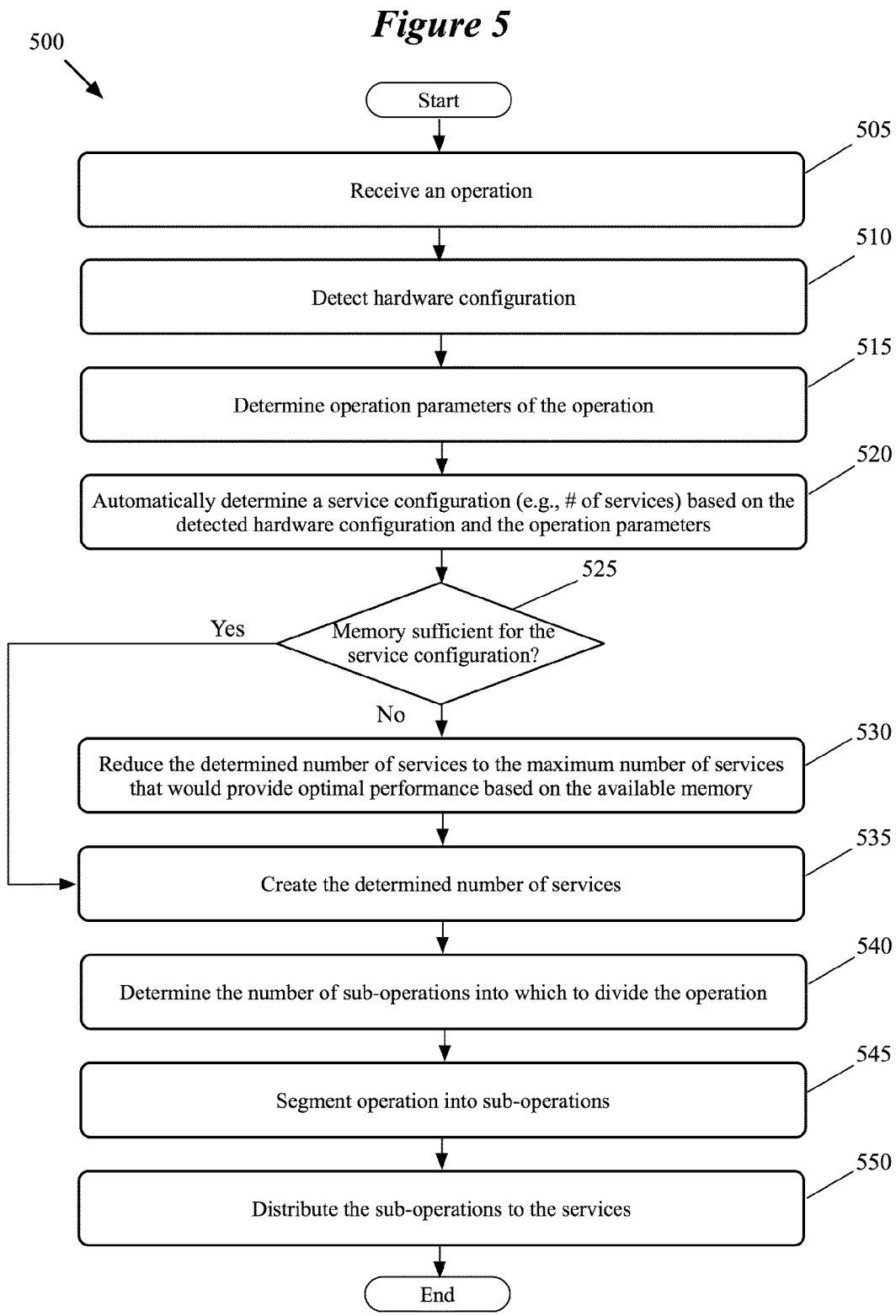
FIG. 5 conceptually illustrates a process of some embodiments for the determination of a service configuration for performing an operation.

FIG. 5 conceptually illustrates a process 500 of some embodiments for the determination of a service configuration for performing an operation. The process 500 will be described by reference to FIGS. 6-9, which illustrate examples of the instantiation of a service configuration for an operation using a service configuration table and the distribution of sub-operations to the instantiated services for processing.

As shown in FIG. 5, the process 500 begins by receiving (at 505) an operation. As described above, an operation of some embodiments may be an encoding project, a printing task, etc. For example, in some embodiments a user might instruct a video-editing application to render a set of video files into a single longer video file having a particular format. In some embodiments, the system may receive several operations to perform (e.g., specified by a user) where the service configuration for each operation is determined one after another. These operations may be stored in a queue in the order received.

Figure 6:
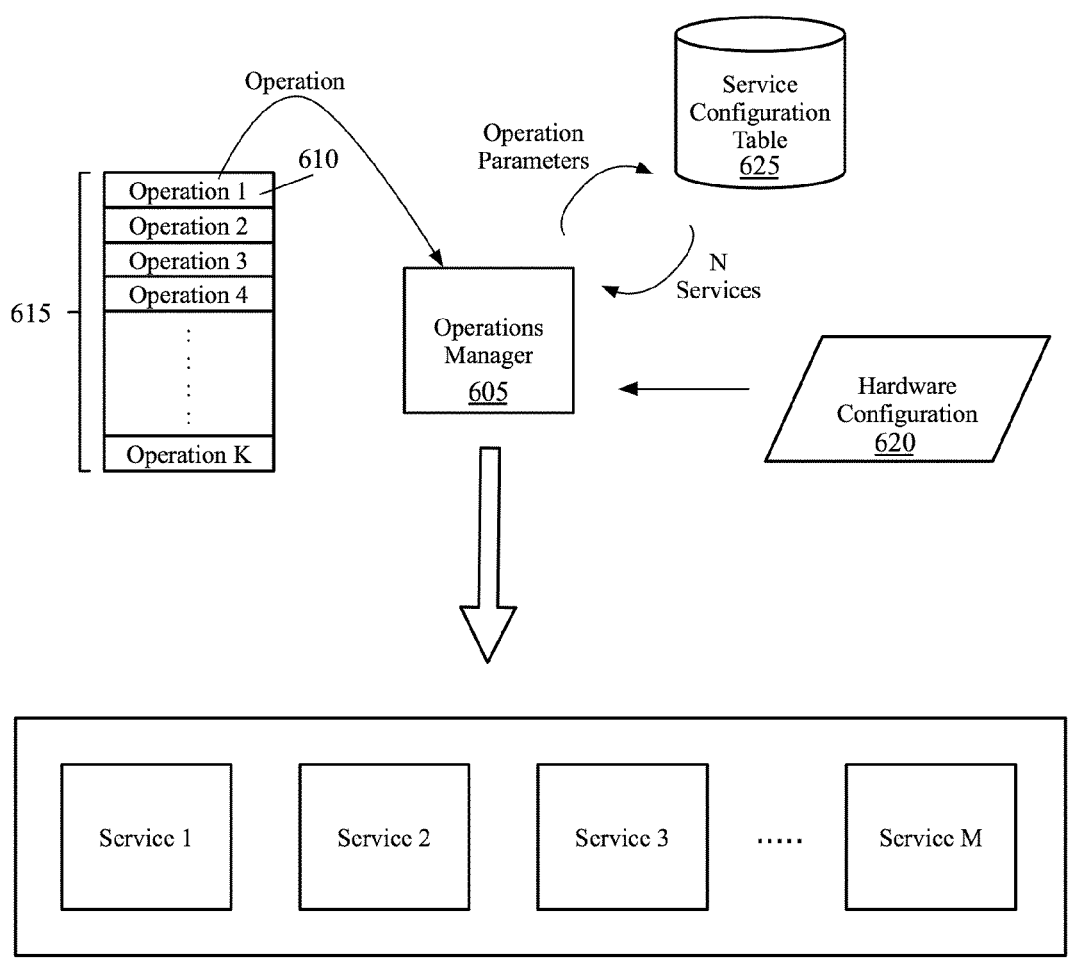
FIG. 6 conceptually illustrates an example of the instantiation of services for an operation.

FIG. 6 conceptually illustrates an example of the instantiation of services for an operation. In this example, an operations manager 605 determines a service configuration for each operation using a service configuration table 625. The operations manager 605 receives a first operation (i.e., Operation 1 610) out of a queue of operations (i.e., K total operations 615). The operations 615 may be different operations (e.g., encoding video data to a particular resolution with H.264 encoding and encoding video data to another resolution with MPEG-2 encoding) in some cases, or similar operations (e.g., compressing several different pieces of audio data to the same resolution with MP3 encoding) in other cases.

In some embodiments, a user of an electronic device may request the electronic device to perform operations within a short time span (e.g., 30 seconds, 2 minutes, 5 minutes, etc.). The operations may be received through user selection (e.g., through a click operation, a touchscreen operation, etc.) on a graphical user interface (GUI) that is part of a media editing application (e.g., Final Cut Pro®, iMovie®, etc.). The GUI may present various options that allow a user of the media editing application to select an operation to perform on a particular file (e.g., audio data, video data, picture data, other media data, etc.).

Some embodiments do not receive the particular operation to perform directly through user selection of the particular operation, but instead indirectly as a result of user selection of an option that requires the particular operation. For example, the user may indicate through a GUI of a media-editing application that he wants to upload a video onto YouTube®. Depending on the current status of the video (i.e., whether the video is stored in a single file that has the correct format for upload to YouTube®), the media-editing application may need to perform multiple operations to achieve the user-specified result.

Returning to FIG. 5, the process 500 next detects (at 510) the hardware configuration (e.g., amount of physical memory, processing speed, number of cores, etc.) on the electronic device upon which the operation is to be performed. As shown in FIG. 6, the operations manager 605 detects and receives hardware configuration data 620 of the electronic device upon which the operation (i.e., Operation 1 610) is to be performed. The hardware configuration data 620 may include information about various hardware resources of the device, such as the number of cores of the device, the amount of physical memory, processing speed of the device, etc.). In addition, in some embodiments the device may be connected to at least one other electronic device through a network connection (e.g., forming a cluster), thereby increasing the total amount of hardware resources available.

The system of some embodiments may detect the hardware configuration of an electronic device by accessing a data storage that includes information about the various components on the electronic device. Some embodiments access the operating system of the device in order to retrieve the hardware configuration. Some embodiments only detect the hardware resources that are currently available instead of the total amount of hardware resources located on the electronic device, as a portion of the hardware resources located on the electronic device may be occupied by operating another program or performing another operation (e.g., the user constantly playing a graphics-intensive video game).

The process 500 then determines (at 515) operation parameters of the received operation. The operation parameters of an operation may include various properties of the operation. For example, when the received operation is an encoding operation, the parameters may include the source codec of the operation, the output setting of the operation, etc. As shown in FIG. 6, the operations manager 605 of the device determines the operation parameters of the operation from the received operation 610. In some embodiments, the operation parameters match the parameters in service configuration table 625 (which may be different in different embodiments). Some embodiments store these operation parameters for later use (e.g., in memory).

Next, the process 500 automatically determines (at 520) a service configuration based on the detected hardware configuration and the operation parameters. As mentioned above, the system of some embodiments may determine a service configuration for an operation by using a service configuration table (e.g., a lookup table). Some embodiments may perform a mapping function that outputs a corresponding service configuration for a hardware configuration and a set of operation parameters. In some embodiments, the service configuration table enables a system to obtain a service configuration that identifies the number of services to run for a particular operation that would maximize performance of the particular operation.

In FIG. 6, the operations manager 605 determines the service configuration for the operation 610 by mapping the determined operation parameters (e.g., retrieved from a data storage) to a particular cell in a service configuration table 625, which indicates a number of services. In this example, the service configuration table 625 returns N services for the operation.

In the above example, the service configuration table 625 returns a number of services to the operations manager 605. In other embodiments, however, the service configuration table provides values that the operations manager uses to automatically calculate a number of services. In some embodiments, the service configuration returned by the service configuration table identifies the service's core utilization (which indicates the number of cores each service would use) for performing the operation and a maximum number of services to instantiate. The system may then compute the number of services appropriate to run for the operation. Based on these service configuration values and the actual number of cores of the device, the method of some embodiments calculates a number of services to instantiate for performing the operation.

Figure 7:
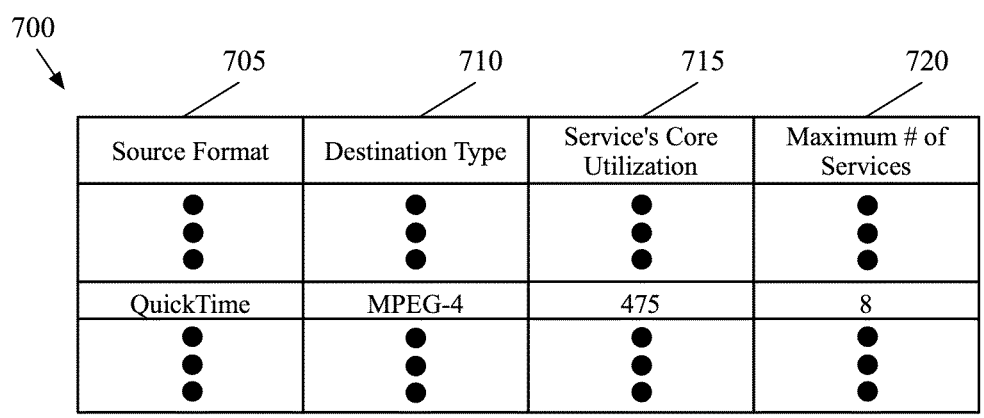
FIG. 7 illustrates an example of a service configuration table that enables a system to obtain a service's core utilization for performing an operation and a maximum number of services to instantiate based on a set of parameters.

FIG. 7 illustrates an example of a service configuration table 700 of some embodiments that enables a system to obtain a service's core utilization for performing an operation and a maximum number of services to instantiate based on a set of parameters. In this example, the service configuration table 700 provides these values 715 and 720 for different video encoding operations (e.g., that could be specified by a user through a video-editing application). As shown, the set of parameters 705 and 710 includes a source format and a destination type of the video encoding operation.

As shown, in this example the service's core utilization for an encoding job that converts video from QuickTime to MPEG-4 is 475 (i.e., each service would use 4.75 cores) and the maximum number of services to run for this particular encoding task is 8. Some embodiments store the core utilization as the number of cores multiplied by 100 in order to be able to store an integer value rather than a floating point decimal in the table. In some embodiments, the service configuration table is stored in the filesystem of the device in a property list format (e.g., as an eXtensible Markup Language (XML) file).

In order to automatically determine the service configuration for a particular operation, the system of some embodiments may retrieve these two values from the table based on the parameters of the particular operation. The system then uses these two values and the hardware configuration to determine the number of services to run.

Some embodiments first calculate an initial number of services by dividing the number of central processing unit (CPU) cores available (e.g., the number of cores of the device performing the operation) by the service's core utilization (which may be first divided by 100 in the example shown in FIG. 7), and truncating the result at the decimal point (e.g., using the floor( ) function). In this example, the initial number of services would be 1 for an 8-core machine (8/4.75≈1.68) and 3 for a 16-core machine (16/4.75≈3.37). The system of some embodiments then uses the lesser of the initial number of services and the maximum number of services retrieved from the configuration table (e.g., using the min( ) function). In this example, both 1 and 3 are less than 8, so the determined service configuration would be 1 for an 8-core machine and 3 for a 16-core machine.

Returning to the process 500, the process determines (at 525) whether the available memory (e.g., RAM) is sufficient for the service configuration. In some embodiments, each service (e.g., compressor daemon, RV daemon) requires a certain amount of physical memory. If the system allocates insufficient memory to each service, swapping (i.e., use of hard disk space as virtual memory) may take place, which will cause the system to slow down (e.g., the system may thrash). In other words, running the determined service configuration when the physical memory resources available to the electronic device are less than the total amount of memory the service configuration requires (i.e., exceeding the throughput) would make the processing slower.

When the process 500 determines that the memory is insufficient for the service configuration, the process reduces (at 530) the determined number of services to the maximum number of services that can run given the amount of physical memory available to the device. In some embodiments, the system divides the amount of physical memory available by the amount of memory required by each service to determine a maximum number of services based on the memory. If the number of services in the determined service configuration is greater than this new maximum number, the system reduces the number of services to this maximum number that is based on the memory. For example, if an electronic device has 2 GB of RAM and each service uses 1 GB of RAM, then the maximum number of services based on the available physical memory is 2 services.

Using the example from above, in the 8-core example (in which the number of services determined at operation 520 is 1), this number is not reduced any further. However, in the 16-core example (where the process determined to instantiate 3 services at operation 520), the process 500 would reduce the number of services to 2 to account for the lack of available physical memory.

The process next creates (at 535) the determined number of services. This may be the number of services determined at operation 520 or the reduced number determined at 530, depending on the amount of available physical memory. As will be described below in Section II, some embodiments create services for each operation and then terminate these services after each operation. Some embodiments do not terminate the services after performing the operation, but the services self-terminate after being idle for some period of time. In some of such embodiments, the device only creates additional services if the current operation calls for more services than are currently operational.

As shown in FIG. 6, the operations manager 605 determines whether the hardware configuration 620 of the device upon which the operation 610 is executed has sufficient physical memory to run the service configuration specified by the service configuration table 625 (i.e., N services). In this example, the hardware resources are not sufficient to handle N services, so the operations manager 605 creates M services (M<N), the maximum number of services that the hardware configuration 620 can support without performance degradation. If the hardware configuration could handle N or more services, then the operations manager would instantiate N services instead.

The process 500 then determines (at 540) the number of sub-operations into which to divide the received operation. Some embodiments determine the number of these sub-operations by communicating with at least one of the instantiated services. Some embodiments communicate with only one of the instantiated services to determine the number of sub-operations. In some embodiments, the system uses a service queue to keep track of the instantiated services and the operations manager communicates with the first service in the service queue to determine the number of sub-operations. The service then determines whether the operation can be segmented (as one example, some audio operations cannot be segmented because of discrepancies that would result at the segment edges) and the number of pieces into which the operation should be segmented.

When the service determines that a particular operation may not be segmented or may not meet a threshold quality when the segmented portions are put back together because of the nature of the operation or the type of data operated upon, the operation will be performed by only one of the services. When the operation is segmentable, some embodiments segment the operation into the same number of sub-operations as the number of instantiated services. Some embodiments segment the operation into a multiple (e.g., two times, three times) of the number of services that are available.

With the number of sub-operations determined, the process segments (at 545) the operation into this determined number of sub-operations. Different embodiments may segment the operation differently depending on the type of data used by the operation. For instance, for a video encoding operation, the system may segment the video into segments with equal duration (e.g., for a 10-minute length of video and four sub-operations, each sub-operation would encode 2 minutes and 30 seconds of video).

Figure 8:
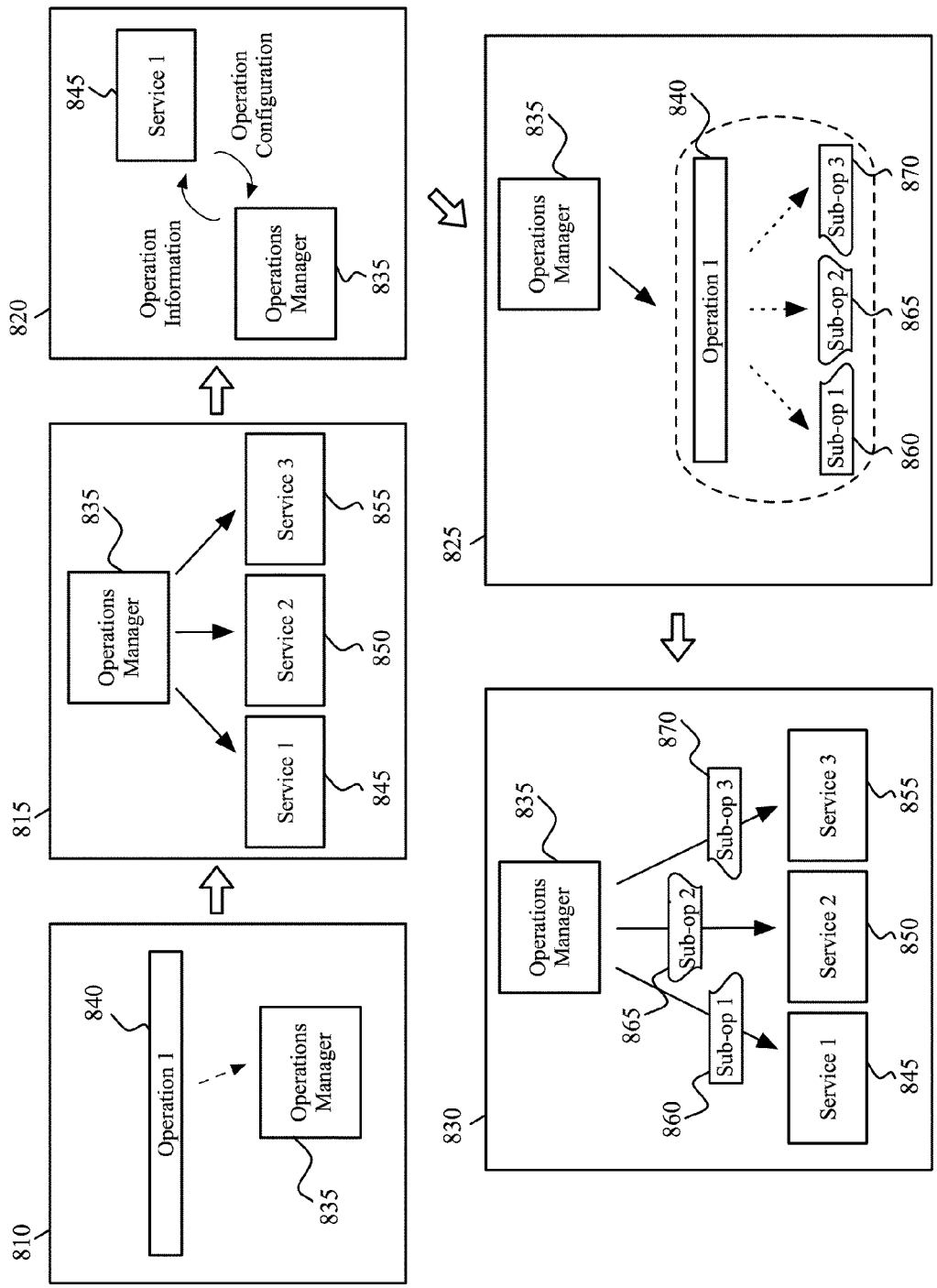
FIG. 8 illustrates an example of the segmentation and distribution of an operation by an operations manager.

FIG. 8 illustrates an example of the segmentation and distribution of an operation by an operations manager 835. FIG. 8 is illustrated in five stages 810-830, in which the operations manager 835 receives an operation, instantiates services, segments the operation into sub-operations, and distributes the sub-operations to the instantiated services. In this figure (and subsequent figures), stages are separated using boxes for clarity.

The first stage 810 of FIG. 8 illustrates an operations manager 835 receiving an operation 840 (e.g., an encoding operation). The second stage 815 illustrates the creation of three services 845-855 upon the determination (e.g., by the operations manager 835) of the number of services that would maximize the utilization of the hardware resources on the electronic device. This determination is made automatically in the manner described above in some embodiments.

The third stage 820 illustrates the determination of the number of sub-operations into which to break the operation 840. As shown, the operations manager 835 communicates with the services 845 by sending information about the operation 840 to the service 845 and then receiving an operation configuration from the service 845. For example, for an encoding operation, the operations manager 835 might send the source and destination formats, the type of data, the number of services created, etc. The operation configuration of some embodiments specifies the number of sub-operations into which to break the operation.

As shown in FIG. 8, the fourth stage 825 illustrates the segmentation of the received operation 840 according to the operation configuration. The operations manager 835 breaks the operation 840 into three sub-operations 860-870 according to the operation configuration received in the third stage 820. In this example, the sub-operations 860-870 are evenly partitioned (e.g., each encodes an equal duration of media).

Returning to FIG. 5, the process 500 next distributes (at 550) the sub-operations to the services for processing, then ends. In some embodiments, each service processes one sub-operation at a time. In other embodiments, each service may process multiple sub-operations at a time. When the number of sub-operations is equal to the number of instantiated services, the process distributes one operation to each service. As shown in the fifth stage 830 of FIG. 8, the operations manager 835 distributes each sub-operation 860-870 to a different one of the services 845-855.

As mentioned above, in some embodiments the service determines that the number of sub-operations into which to break the operation is a multiple of the number of services. In this case, each service may process a sub-operation while the remaining sub-operations are stored in a queue. When a service finishes processing a sub-operation, the system distributes another sub-operation to the service for processing. In such embodiments, the faster services are able to process more sub-operations, thereby increasing the overall speed for processing the operation.

Figure 9:
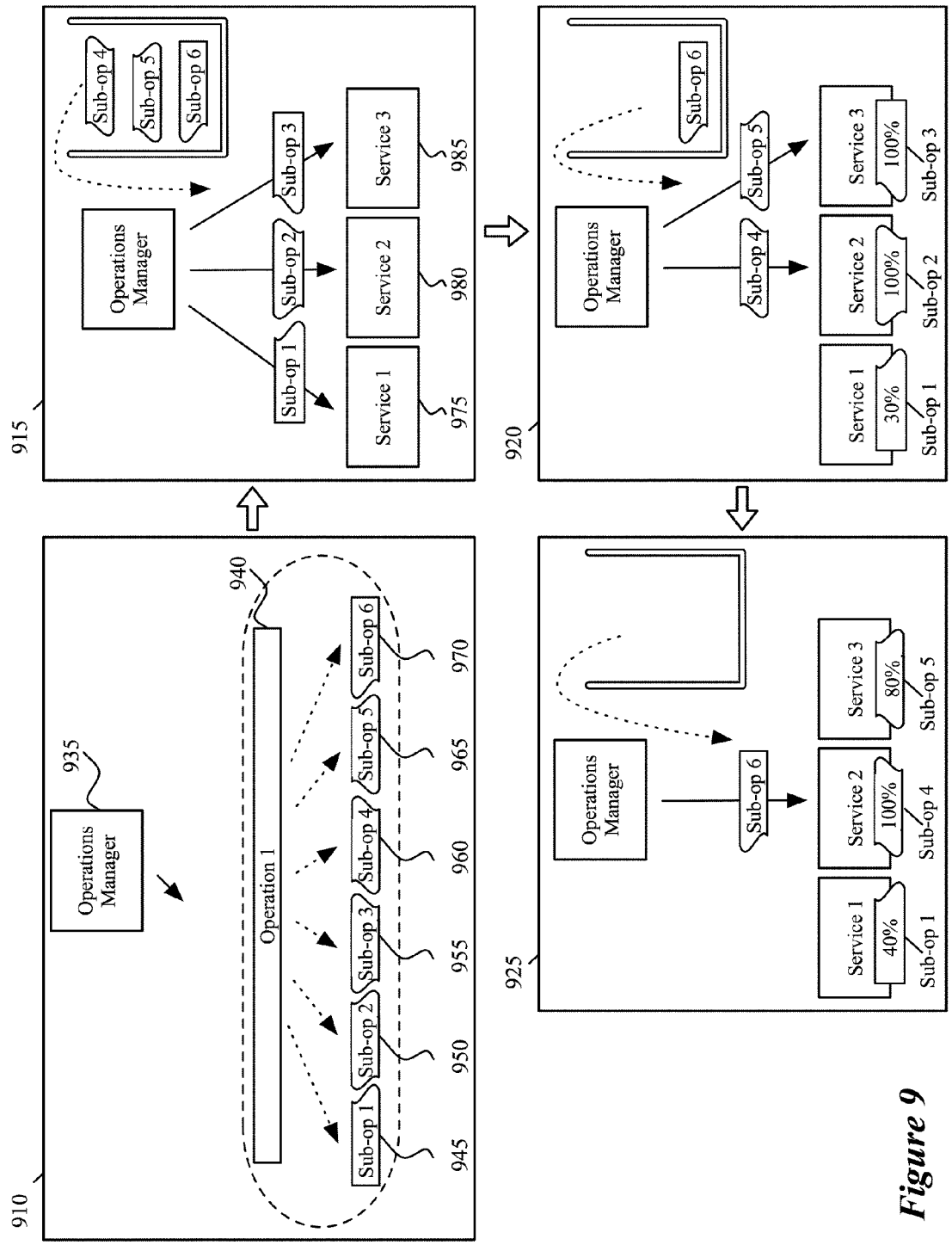
FIG. 9 illustrates the distribution of sub-operations to the instantiated services when an operation is partitioned into more sub-operations than the number of services available.

FIG. 9 conceptually illustrates the distribution of sub-operations when an operation is partitioned into more sub-operations than the number of services available. As shown, FIG. 9 is illustrated in four stages 910-925, in which the operations manager 935 partitions an operation into six sub-operations and distributes the sub-operations.

The first stage 910 illustrates the operations manager 935 segmenting the operation 940 into six sub-operations 945-970. The operations manager 935 may have segmented the operation 940 according to the operations described in FIG. 5, similar to the segmentation shown in FIG. 8. In this case, however, there are more sub-operations than the number of services instantiated by the operations manager 935. As shown in the second stage 915, the operations manager 935 has instantiated three services 975-985.

Stages 915-925 illustrate the distribution of the sub-operations 945-970 to the services 975-985. The second stage 915 illustrates the operations manager 935 distributing the first three sub-operations 945-955 to the three services 975-985 (one operation to each service). The remaining sub-operations 960-970 remain in the queue until one of the services finishes its first sub-operation.

In the third stage 920, the operations manager 935 distributes additional sub-operations to services that have finished processing their previously received sub-operations. As mentioned above, some services may process their sub-operations faster than other services. In this example, services 980 and 985 have completed processing their sub-operations 950 and 955, while service 975 is only 30% complete with sub-operation 945. Therefore, the operations manager 935 distributes another sub-operation to each of services 980 and 985 (sub-operations 960 and 965, respectively). The operations manager 935 retrieves sub-operations 960 and 965 from the queue and distributes them for processing, while service 975 continues to process sub-operation 945.

In the fourth stage 925, the operations manager 935 distributes the final sub-operation (sub-operation 970) to service 980 upon the service's completion of sub-operation 960. At this point, service 975 is only 40% complete with sub-operation 945 and service 985 is only 80% complete with sub-operation 965. At this point, all of the sub-operations are completed or distributed to a service, and the operation will complete once these three sub-operations are finished by their respective services.

Instead of segmenting an operation into the exact number of service that are created, in this case segmenting an operation into a multiple of the number of services (e.g., twice, three times) enabled the services to perform the operation faster because the services that were performing at a faster rate were able to perform a larger portion of the total operation than the slower services. Various factors may determine the relative speed at which different services perform the sub-operations. For example, if one of the services utilizes a core that is also being utilized by a processor-intensive application, that service may process its sub-operations slower. In addition, the different services may be operating on different physical devices (e.g., devices in a cluster) that have different capabilities.

The segmentation of an operation into a multiple of the number of services also enables some embodiments to create additional services if resources are freed up during the performance of an operation. For example, some embodiments may use the amount of free memory and free processor cores (i.e., resources that are not in use by other programs) in performing the service configuration determination, rather than just looking at the characteristics of the device performing the operation. If these hardware resources are freed up while sub-operations remain to be distributed, some embodiments detect the newly available resources, instantiate additional services, and distribute remaining sub-operations to these newly instantiated services.

II. Performance of Multiple Operations

The previous section described the performance of a single operation by a system of some embodiments. Some embodiments allow a user to select multiple operations for a system to perform (e.g., by requesting the performance of a second operation before a first operation is completed, or by requesting a result that actually requires multiple different operations). In some embodiments, the system performs the operations in series and allows subsequent operations to use the same services that were previously created for another operation.

Figure 10:
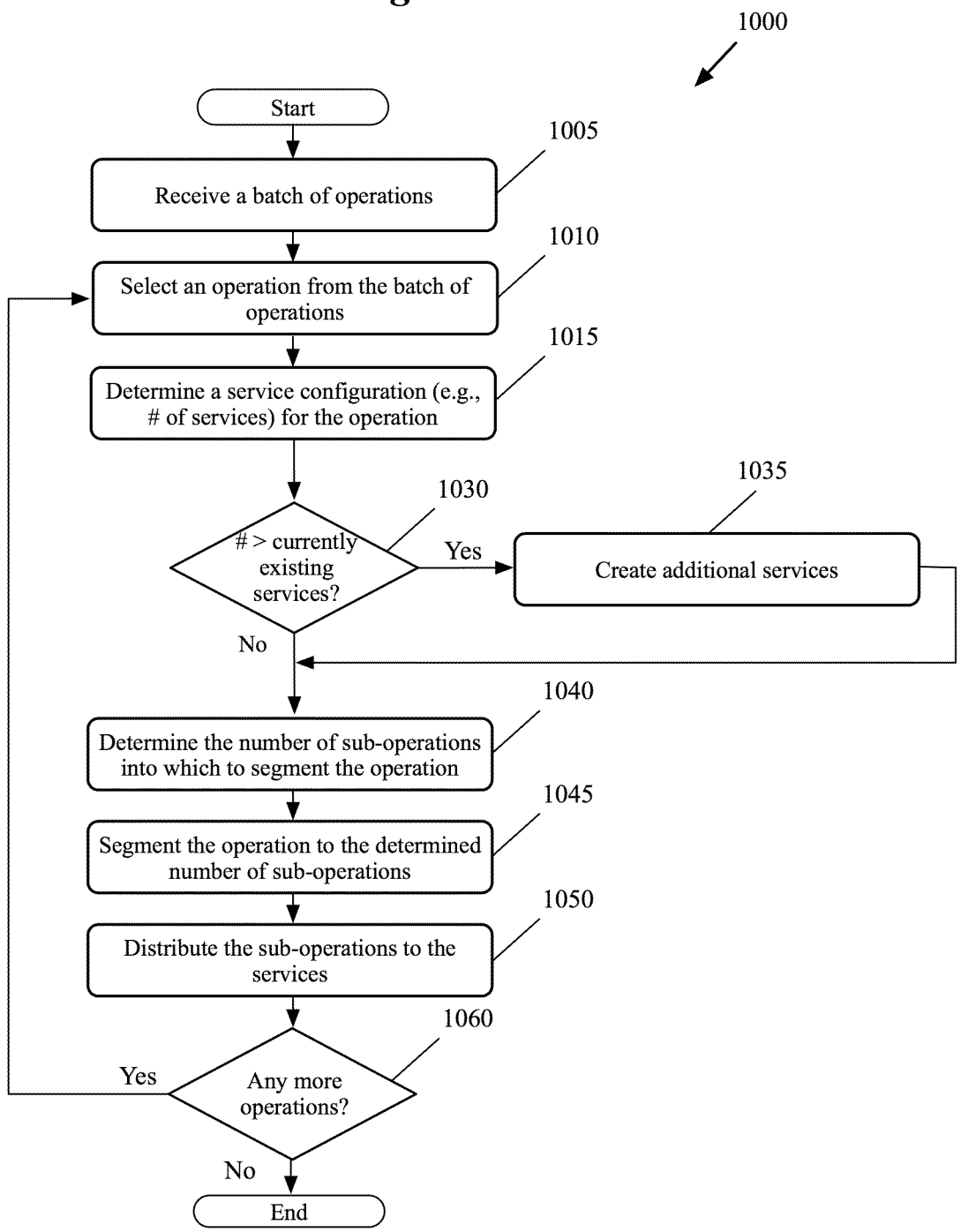
FIG. 10 conceptually illustrates a process of some embodiments for performing multiple subsequent operations.

FIG. 10 conceptually illustrates a process 1000 of some embodiments for performing multiple subsequent operations. As shown in FIG. 10, the process 1000 begins by receiving (at 1005) a batch of operations. As mentioned above, a user of an electronic device may make several requests for a computer system to perform (e.g., upload a video presentation to You-Tube® and create a DVD from the video presentation). In some embodiments, each request may generate several operations for the process to perform. For instance, if converting a video presentation into a format for upload to YouTube®, different operations may be specified for the conversion of different video clips that make up the video presentation. The system of some embodiments may place the batch of operations in a queue data structure and then perform the operations one after another.

The process 1000 then selects (at 1010) an operation from the batch of operations to perform. As mentioned above, the operations may be stored in a queue data structure. Some embodiments may perform first in, first out processing (FIFO) and select the first operation (e.g., the first selected by the user) from the batch to perform. In some cases, the operations will need to be performed in a particular order, when a second operation uses the output of a first operation.

The process 1000 then determines (at 1015) a service configuration (e.g., the number of services) for the operation. As described above, some embodiments determine the service configuration using a service configuration table. The service configuration determined using the table may be further modified based on the sufficiency of the hardware resources of the device(s) performing the operation.

With a number of services to use for the current operation identified, the process determines (at 1030) whether the number of services needed is greater than the number of services currently instantiated and available for use. For example, when the selected operation is the first operation (e.g., the first operation in a batch of operations, the first operation received from a user after powering up a system or opening an application, etc.), then there will not be any services currently instantiated (or only one service, if it is a service that automatically runs at all times). In addition, if an operation calls for more services than the preceding operation, there may not be enough services instantiated to perform the operation according to the service configuration determined for the operation.

On the other hand, an operation might require the same number or fewer services than the preceding operation. Rather than creating a new set of services for each new operation, the system of some embodiments keeps services active for a particular amount of time even when the services are not in use. When a new operation is received, the operation can utilize some or all of these services that already exist rather than the system creating new services (which may be an unnecessary time-consuming process). In some embodiments, the system keeps track of the available services via a service queue, and the first services in this queue are used to perform the operation.

When the number of services in the service configuration for the currently selected operation is greater than the number of currently available services, the process creates (at 1035) any necessary additional services. The number of additional services created, in some embodiments, is the number of services in the service configuration minus the number of currently existing services. As mentioned, allowing subsequent operations to use services that were previously created saves the time that would be used in terminating and restarting the services for each operation.

With at least the number of services required by the service configuration instantiated, the process 1000 determines (at 1040) the number of sub-operations into which to segment the operation. As described above, the system of some embodiments determines the number of sub-operations into which to segment the operation by sending a set of operation parameters (e.g., for an encoding project, the type of project, source codec, output setting, etc.) and the number of services being used to one of the operational services (e.g., the first service in the service queue). In some embodiments, the service determines the number of sub-operations into which to segment the operation (e.g., the number of services or a multiple thereof).

The process 1000 then segments (at 1045) the operation to the determined number of sub-operations. As described above, the system of some embodiments segments the operation by partitioning a piece of data into multiple segments of equal or near-equal duration. Some embodiments may segment the data differently (e.g., by segmenting the data at a location that would minimize quality loss when the segments are put back together in the final output).

Next, the process distributes (at 1050) the sub-operations to the services. As described above, the system of some embodiments distributes one sub-operation to a service at a time. Some embodiments allow a service to finish performing an operation before distributing another operation to the service. Other embodiments distribute a number of sub-operations to each service for processing.

Once the current operation has been segmented and distributed by the operations manager, the process 1000 then determines (1060) whether there are any more operations in the queue for the system to perform. Some embodiments also wait for the services to finish processing the current operation before determining whether more operations remain. When the process determines that there are more operations that need to be performed, the process 1000 returns to 1010 to select another operation from the batch of operations. When no additional operations remain, the process ends.

Figure 11:
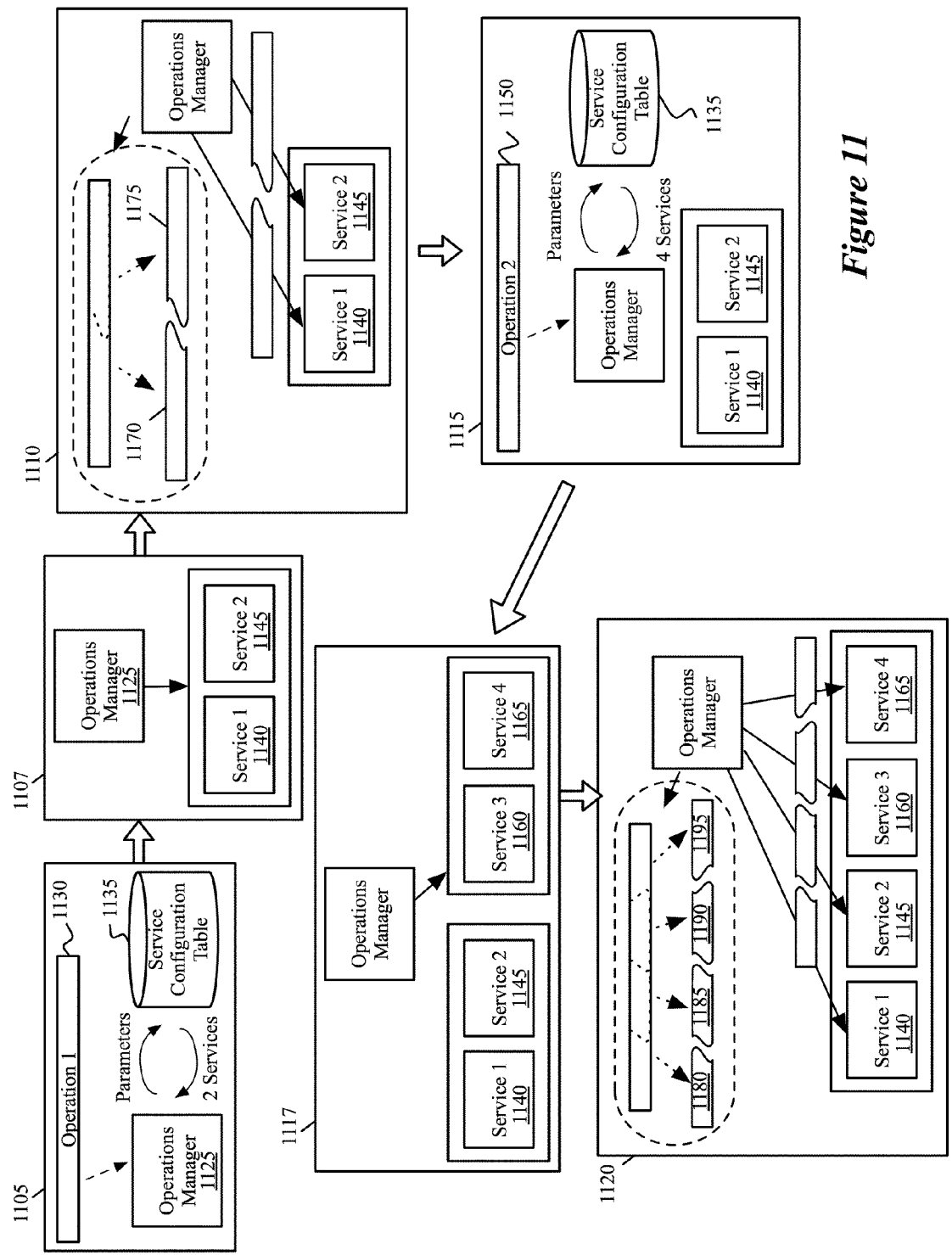
FIG. 11 illustrates an example of the utilization of previously created services and the creation of additional services for performing a second operation that calls for a greater number of services than the number of currently existing services.
Figure 12:
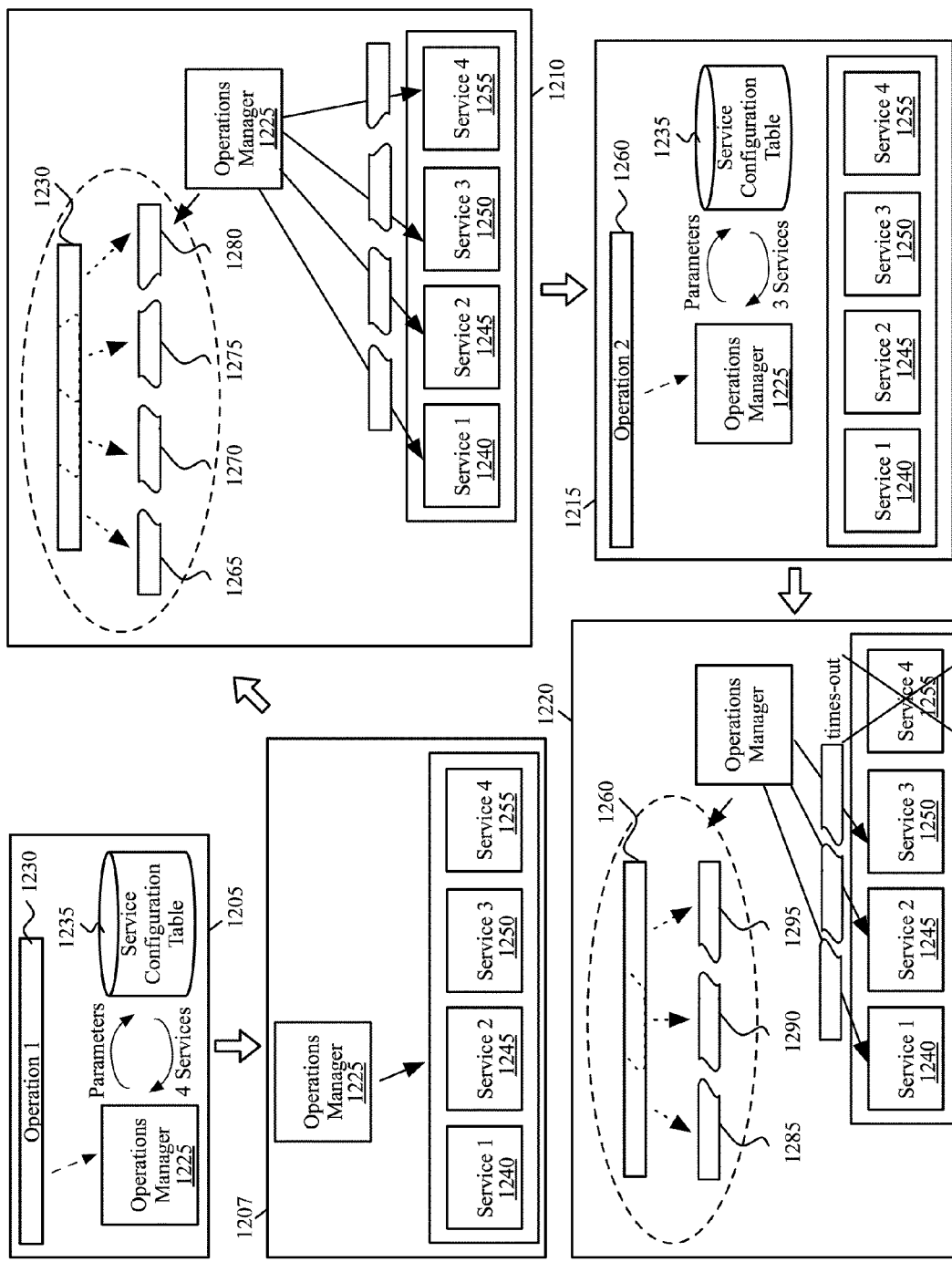
FIG. 12 illustrates an example of the utilization of a subset of previously created services for performing a second operation that calls for fewer services than the existing number of services and the self-termination of the excess services.

FIGS. 11 and 12 illustrate two examples of modifications to the service configuration as the system of some embodiments processes multiple subsequent operations. FIG. 11 illustrates an example of the utilization of previously created services and the creation of additional services for performing a second operation that calls for a greater number of services than the number of currently existing services in six stages 1105-1120, while FIG. 12 illustrates an example of the utilization of a subset of previously created services for performing a second operation that calls for fewer services than the existing number of services and the self-termination of the excess services in five stages 1205-1220.

The first stage 1105 of FIG. 11 illustrates the determination of a service configuration by an operations manager 1125 of some embodiments. As shown, the operations manager 1125 receives an operation 1130 and determines a service configuration for the operation 1130 by using a service configuration table 1135. The operations manager may receive a service configuration directly from the service configuration table, or receive values used to compute the service configuration. Here, the operations manager 1125 determines that it should use two services for performing the operation 1130. As shown at this stage, there are no services currently instantiated to perform operation 1130.

The second stage 1107 illustrates the creation of two services 1140 and 1145 for the performance of the operation 1130. As no services were previously instantiated, the operations manager 1125 has to instantiate both services at this time.

The third stage 1110 of FIG. 11 illustrates the distribution of sub-operations to the newly instantiated services 1140 and 1145. Here, the operations manager 1125 segments the operation 1130 into sub-operations 1170 and 1175 and distributes the sub-operations to the created services 1140 and 1145. Since the number of sub-operations is the same as the number of services, each of the services processes one sub-operation. As mentioned above, the creation of multiple services to perform an operation enables a system of some embodiments to more efficiently perform the operation. The multiple services process portions of the operation at the same time to complete the task more efficiently.

The fourth stage 1115 illustrates an example of the creation of additional services for performing a second, subsequent operation in the case that the second operation requires more services than the first operation. The operations manager 1125 receives a subsequent operation 1150 and determines a service configuration for the operation 1150 by using the service configuration table 1135. Here, the operations manager 1125 determines that it should use four services for performing the operation 1150.

The fifth stage 1117 illustrates that because the determined number of services (i.e., the four services) is greater than the existing number of services (i.e., the two services 1140 and 1145), the operations manager 1125 of some embodiments creates two additional services 1160 and 1165 for performing the operation 1150. As the two services 1140 and 1145 used to process the previous operation 1130 have not timed out, these services may be reused for operation 1150 in addition to the two newly created operations.

The sixth stage 1120 of FIG. 11 illustrates the distribution of sub-operations for operation 1150 to the services 1140, 1145, 1160, and 1165. The operations manager 1125 segments the operation 1150 into four sub-operations 1180-1195 and distributes the sub-operations to these services 1140, 1145, 1160, and 1165. Since the first two services 1140 and 1145 were created for performing a previous operation, the operations manager 1125 reuses the created services for performing two sub-operations and distributes the other two sub-operations to the two newly created services 1160 and 1165.

The above example of FIG. 11 illustrated a case in which a subsequent operation uses more instantiations of a particular service than a previous operation, and therefore not only reuses the services instantiated for the previous operation but also requires the instantiation of additional services. FIG. 12 illustrates the case in which the second of two operations requires fewer instantiations of a service than the first operation.

The first three stages 1205-1210 are similar to the first three stages 1105-1110 of FIG. 11, except that the service configuration for the first operation 1230 specifies four services rather than two. At the first stage 1205, the operations manager 1225 determines the service configuration for the operation 1230 using the service configuration table 1235. At the second stage 1207, the operations manager 1225 instantiates four services 1240-1255, and at the third stage 1210, the operations manager 1225 segments the operation 1230 into four sub-operations 1265-1280 and distributes the sub-operations to the four services 1240-1255. As no services were previously instantiated, the operations manager 1225 had to instantiate all four services at this time.

The fourth stage 1215 in FIG. 12 illustrates an example of a subsequent operation that calls for only a subset of the services that was already instantiated from the performance of a previous operation. Here, the operations manager 1225 receives a second operation 1260 and determines a service configuration using the service configuration table 1235 for the second operation 1260. The operations manager 1225 determines that it should use three services for performing the operation 1260. These three services are less than the number of instantiated services. As such, the operations manager does not need to create additional services at this time in order to perform operation 1260.

The fifth stage 1220 illustrates the distribution of sub-operations to services designated by a service configuration. As the service configuration for operation 1260 only calls for three services, the operations manager 1225 segments the operation 1260 into three sub-operations 1285-1295 and distributes the sub-operations to the already-instantiated services 1240-1250. Some embodiments randomly choose which of the already-instantiated services to use. Other embodiments store data indicating how quickly each of the services processed previous operations, and preferentially use the faster services.

In this example, the determined number of services (i.e., three services) is less than the currently existing number of services (i.e., four services). As the last service 1255 is not used for the performance of this operation 1260, the service 1255 may terminate itself (e.g., stop performing any processes and end) after a threshold duration of inactivity (e.g., 30 seconds, 15 minutes, 1 hour, etc.), thereby freeing up any hardware resources that were being taken up by the service 1255. When the threshold duration is long enough, a service may be instantiated and used for a first operation, then not used for a second, subsequent operation, but still active for a third operation that requires its use.

While this example shows a service self-terminating based on a time-out, some embodiments actively terminate the services when performing an operation that does not require the services, in order to free up these hardware resources. Each service occupies a certain amount of hardware resources, even when not performing an operation. Therefore, terminating the services when they are not needed can free up hardware resources. However, starting up and terminating services requires a certain amount of overhead in terms of time and processing power. Therefore, some embodiments may weigh the benefits in terminating the services (or allowing the services to self-terminate) with the time and processing power consumed in terminating and restarting the services to determine the threshold duration before terminating the services (or allowing the services to self-terminate).

The above examples illustrate the creation of multiple services in order to perform a particular operation. In some embodiments, the operations manager that instantiates the services is part of a media-editing application, and the operations performed by the services are video encoding operations (i.e., encoding a segment of video in a particular format). As a specific example, the services might be instantiations of the compressord daemon that some media-editing applications use for encoding video.

Figure 13:
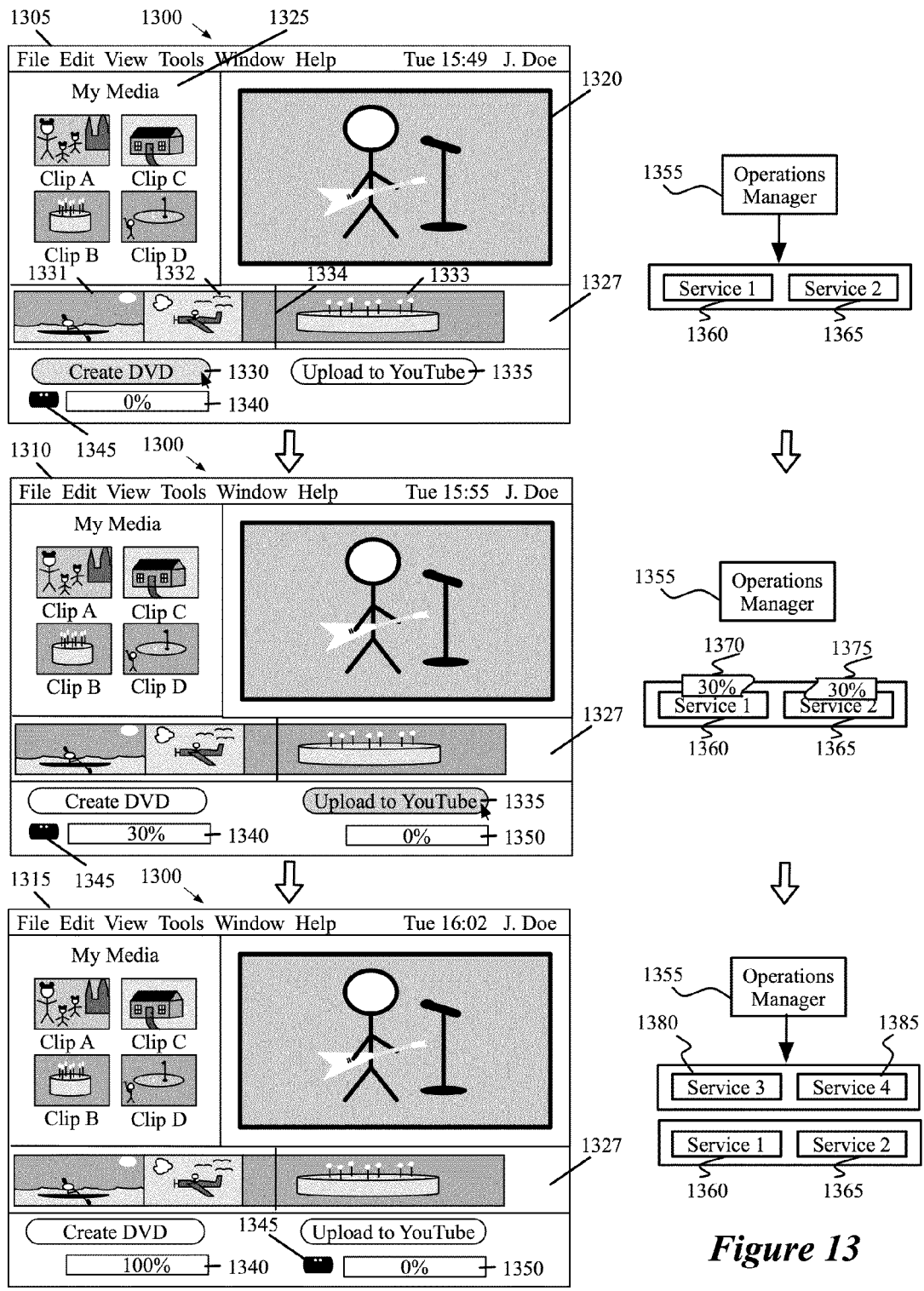
FIG. 13 illustrates an example of a graphical user interface (GUI) of some embodiments that enables a user to request for a number of tasks to be performed on a video presentation (e.g., a composite presentation composed of several video clips).

In some cases, the video encoding operations may be performed in response to user-specified operations. FIG. 13 illustrates an example of a graphical user interface (GUI) of some embodiments that enables a user to request for a number of tasks to be performed on a video presentation (e.g., a composite presentation composed of several video clips). In some embodiments, a user of the media-editing application may request to create a DVD from a video presentation, to upload a video presentation onto the World Wide Web, to render a composite presentation as a single file, etc. As mentioned, the media clip or media file may include audio data, video data, text data, pictures, and/or other media data.

This figure illustrates the GUI 1300 at three different stages: a first stage 1305 that illustrates the initiation of a first task to be performed by a media-editing application of some embodiments, a second stage 1310 that illustrates the initiation of a second task to be performed by the media-editing application, and a third stage 1315 that illustrates the completion of the first task by the media-editing application. In addition, the figure illustrates the status of an operations manager 1355 that is part of the media-editing application and instantiates services (e.g., compressord daemons) for the tasks requested by the user through the GUI 1300.

As shown in this figure, the GUI 1300 includes a preview display area 1320, a media library 1325, a composite display area 1327, user-selectable user interface (UI) items 1330 and 1335, a progress indicator 1340, and an "in progress" indicator 1345. The preview display area 1320 is an area in the GUI 1300 that displays media (e.g., video, still image, audio displayed as a waveform) selected by a user. In this example, the preview display area 1320 displays an image from a video clip that is part of the composite presentation in the composite display area 1327.

The media library 1325 is an area in the GUI 1300 through which the application's user can select media clips (e.g., for display in the media display area 1320, for adding to the composite display area, etc.). In the example of FIG. 13, the clips in the media library are represented as thumbnails that can be selected and added to the composite presentation in the composite display area 1327 (e.g., through a drag-and-drop operation, a menu selection operation, or a click operation).

In some embodiments, the media library 1325 may include audio clips, video clips, text overlays, pictures, and/or other media.

The composite display area 1327 allows a user to create a composite presentation by placing media clips in sequence along a timeline. In some embodiments, the composite display area may include tracks (e.g., video tracks, audio tracks, etc.) that span the timeline and onto which the user may place media clips. In other embodiments, the composite display area may be a trackless display area that includes a primary compositing lane for primary media clips in sequence, and to which additional media may be anchored. In this example, the user has placed three video clips 1331-1333 in sequence in the trackless composite display area 1327 to form a composite video presentation. As shown, a playhead 1334 is located at a particular time along the timeline of the composite presentation, and the image corresponding to this particular time in the presentation is displayed in the preview display area 1320.

The user-selectable UI items 1330 and 1335 enable a user of the media-editing application to select an operation to perform on a composite presentation (or single media clip) or a task to perform that encompasses performing an operation on the composite presentation or media clip. The user-selectable UI item 1330 allows a user to create a DVD of the composite presentation currently displayed in the composite display area 1327, while the user-selectable UI item 1335 allows a user to upload the composite presentation to YouTube®. In some embodiments, the media-editing application may provide other user-selectable UI items that allow a user to perform other operations on the composite presentation. While these UI items 1330 and 1335 are shown here as selectable buttons, one of ordinary skill in the art will recognize that the tasks represented by the buttons may be accessed in a variety of ways in different embodiments, such as through drop-down or other menus, shortcut keys, etc.

The progress indicator 1340 indicates the progress of a selected operation that the media-editing application is performing (e.g., using one or more services). Some embodiments may indicate the progress using a percentage value that indicates the percentage of the selected operation that the services have completed, though different embodiments may indicate the progress differently. The "in progress" indicator 1345 indicates that a selected operation is in progress. Different embodiments may use different symbols (e.g., an arrow sign, a flashing sign) to indicate that the media-editing application is in the process of performing a selected task. In some embodiments, the progress indicators are shown in a separate window that the application displays upon the request of the user.

The operation of the media-editing application will now be described by reference to the state of the GUI 1300 during the three stages 1305-1315 along with underlying operations of the application. The first stage 1305 illustrates the selection of selectable item 1330 that requests the media-editing application to create a DVD of the composite presentation. To create a DVD format file, some embodiments require the conversion of any video in the composite presentation to a particular format using a particular encoding technique (e.g., MPEG-2 encoding). As such, any video clips in the composite presentation must be retrieved and encoded using the particular encoding technique.

As shown, upon the user's selection of selectable item 1330, the media-editing application highlights the selected selectable item 1330 and then starts to perform the selected operation. The progress indicator 1340 appears upon the user's selection to perform the task and currently indicates that the task is 0% complete, and the "in progress" indicator 1345 appears as the media-editing application starts to perform the selected task. While this figure shows the user selecting the item 1330 with a cursor, one of ordinary skill in the art will recognize that the GUI of some embodiments may be displayed on a touchscreen that has a cursor that is not shown on the screen or that does not have a cursor.

Upon the user's selection of the particular task, the operations manager 1355 determines the number of services to create for performing the first operation required for the particular task, and instantiates this determined number of services. As shown, the operations manager 1355 instantiates two services 1360 and 1365 upon the initiation of this particular task (e.g., upon the user's selection of selectable item 1330 and the application's determination that no such services are currently instantiated). While not shown, the operations manager 1355 then determines the number of sub-operations into which to divide this first operation, segments the operation into sub-operations, and distributes the sub-operations to the services 1360 and 1365 for completion, as described above (e.g., by reference to FIG. 5).

The second stage 1310 illustrates the selection of selectable item 1335 that requests the media-editing application to upload the composite presentation to YouTube®, while the media-editing application is still performing a previously selected operation. Some online video-sharing websites require conversion of video to a particular format using a particular encoding technique, and thus to upload a composite presentation to such a website requires encoding any video clips in the composite presentation using the particular encoding technique.

As shown, upon the user's selection of the selectable item 1335, the media-editing application highlights the selected selectable item 1335. The progress indicator 1350 appears upon the user's selection to perform the task and indicates that the task is 0% complete. The progress indicator 1340 indicates at this point that the first task is 30% complete. The indicator 1345 indicates that the media-editing application is still in the process of performing the first task.

When the user selects to perform a second task, the operations manager 1355 of some embodiments does not immediately begin the performance of the operations for the second task, as the services have not finished performing the first task. As shown, at this point the services 1360 and 1365 are each 30% finished with their respective sub-operations 1370 and 1375. These may be sub-operations for the only operation required by the selected DVD creation task, or may be sub-operations for an intermediate operation (e.g., conversion of the second of three clips in the composite presentation) required by the first selected task.

The third stage 1315 illustrates that upon completion of the first operation, the media-editing application starts to perform the next operation selected by the user. The completion of the first operation is indicated by the 100% displayed in the progress indicator 1340 for the first operation. As shown, the indicator 1345 is now displayed next to the second selected operation 1335 and the progress indicator 1350 appears to indicate that the media-editing application is now starting to process the second operation.

Upon completion of the first operation, the operations manager 1355 proceeds to determine a service configuration for the first operation required by the second task. In this case, the service configuration calls for four services. The operations manager 1355 thus creates the additional two services 1380 and 1385 that are needed to perform the new operation, and reuses the services 1360 and 1365 that were already running.

After the services are created, the operations manager 1355 divides the second operation into sub-operations and distributes the sub-operations to the services, in a similar manner as described above (though with a different number of sub-operations). While this example illustrates the creation of more services for performing a second operation, other embodiments may require fewer services for performing the subsequent operation, and therefore allow the excess services to self-terminate upon non-usage, as previously described.

III. Adaptation of Service Configuration Table

The above sections describe the determination of a service configuration for performing one or more operations on a device. Some embodiments may adapt or fine-tune the service configuration determination for a particular electronic device. As mentioned above, some embodiments determine a service configuration for performing an operation by mapping a set of parameters (e.g., hardware configuration such as amount of RAM or number of processor cores, operation parameters such as the input and output formats for a data conversion operation, etc.) to a service configuration using a service configuration table and/or calculations based on the parameters.

In some embodiments, the service configuration table is generated during the development of an operating system or application (e.g., a media-editing application that uses the services to perform encoding operations). In some embodiments, developers of the software perform testing of different operations on various hardware configurations (e.g., different numbers of cores, different amounts of physical memory, different processors, etc.) to determine the appropriate number of instances of a particular service (e.g., the compressord daemon for encoding projects) that should be run for the different operations. These ideal instance counts are then coded into the service configuration table in some embodiments (e.g., as an XML file) and distributed as part of the application.

The system of some embodiments is enabled to adapt the service configuration table to a particular device or to a particular user of a particular device. Since different users use their devices differently (e.g., by running different types of programs with different regularity), devices with similar hardware configurations may vary in performance (e.g., perform similar operations at different rates). For example, a device whose user primarily uses a word processing application may perform an encoding operation faster than another device whose user is constantly playing Halo® during the encode (which may tax the memory and/or processors). Therefore, some embodiments adapt the service configuration determination (i.e., the service configuration table) to each user and/or device.

Some embodiments adapt the service configuration table by analyzing the historical performance of operations as the operations are performed repeatedly. For example, a system may increase the number of services for performing an operation if the historical performance (e.g., a stored record of one or more previous performances of a similar operation) indicates that using the number of services specified by the service configuration table underutilized the available resources. If the system determines that the operation was performed with increased efficiency with the modified number of services, the system may modify the service configuration (e.g., increase or decrease the number of services) for that type of operation in the service configuration table.

Figure 14:
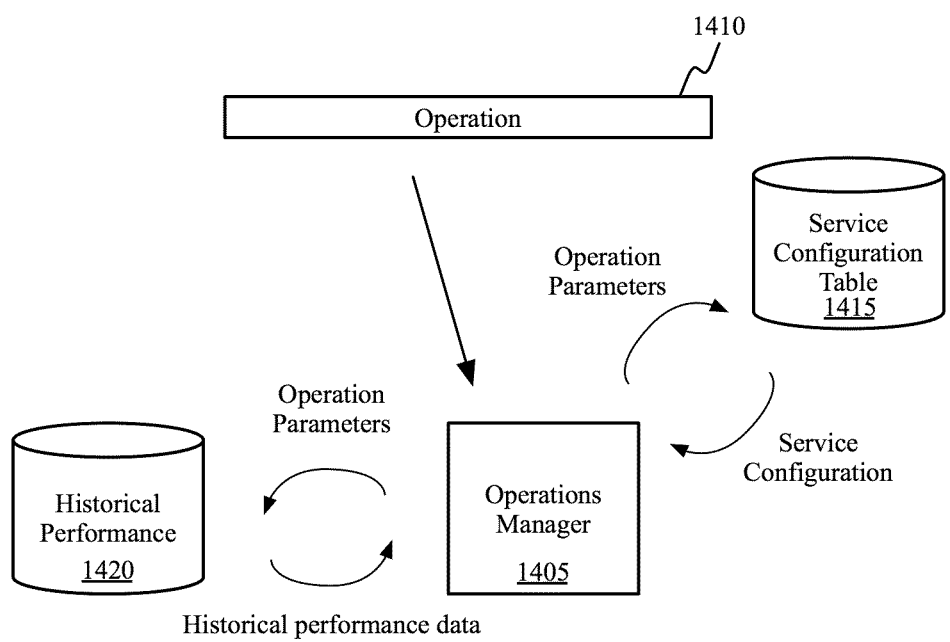
FIG. 14 conceptually illustrates an example of the determination of a service configuration for an operation (e.g., the number of services to use for performing the operation) in an adaptive system.

FIG. 14 conceptually illustrates an example of the determination of a service configuration for an operation (e.g., the number of services to use for performing the operation) in an adaptive system. Similar to the system described above in FIG. 3, upon receiving an operation 1410, the operations manager 1405 maps a set of operation parameters to a service configuration using the service configuration table 1415. However, in this case, the operations manager 1405 may modify the service configuration obtained from the service configuration table 1415 using historical performance data 1420.

In some embodiments, the operations manager uses the historical performance data about past performance of similar operations to determine a service configuration that will maximize the efficiency for performing the operation. The historical performance data may include the number of times the system has performed a similar operation, the service configuration (e.g., the number of services) used each time the system has performed the operation, the percentage of available resources (e.g., hard disk space, amount of RAM, average CPU load) utilized by the different service configurations each time the system performed the operation, the time it took to perform the operation using the different service configurations (e.g., CPU time/usage), the percentage of resources (e.g., hard disk space, amount of RAM, average CPU load) being used by other applications or services during the performance of the operation, etc. Some embodiments may include additional run-time dependent parameters that may be factored into the fine-tuning of the service configuration table (e.g., the frequency and the average duration for which the other applications or services are run). Moreover, for an encoding operation, the historical performance data may further include the source and destination types of the encoding operation, the encoding settings, etc.

In the system of some embodiments shown in FIG. 14, the operations manager 1405 sends a set of operation parameters (e.g., the type of operation such as encoding or decoding, the source codec, the output settings, etc.) for the operation 1410 to a historical performance data storage 1420 to retrieve the historical performance data for operations with the same parameters. The historical performance data storage 1420 may be stored as a database (e.g., a lightweight database such as an SQLite database) or as a different data structure.

Upon retrieval of the historical performance data for the operation 1410, the operations manager 1405 of some embodiments determines a service configuration for the operation. If the data storage 1420 does not include any historical data for the particular operation, then the operations manager will not modify the service configuration generated using the service configuration table 1415. If the operations manager determines that a previous service configuration for the operation used too few of the available hardware resources (e.g., used a percentage of resources that is below a threshold percentage), the operations manager may increase the number of services in the service configuration. On the other hand, if the operations manager determines that a previous service configuration for the operation used too much of the available hardware resources (e.g., used a percentage of resources that is above a threshold percentage), the operations manager may decrease the number of services.

Some embodiments set an ideal range for the hardware resource usage (e.g., between 80-90%). In this instance, if a previous similar encoding operation only used 70% of the available resources, the operations manager may increase the number of services (e.g., add one service to the number of services used in performing the previous similar encoding operation) to increase the percentage of available resources utilized. However, if a previous similar encoding operation used 99% of the available resources, the operations manager may decrease the number of services (e.g., subtract one service to the number of services used in performing the previous similar encoding operation) to lower the hardware resource utilization and avoid overtaxing the system.

By analyzing the historical performances of similar projects, the operations manager may use the data from each performed operation to adjust the service configuration obtained from the service configuration table. As the system performs more and more similar operations, the system can find the best settings for ideal performance of the operation.

Figure 15:
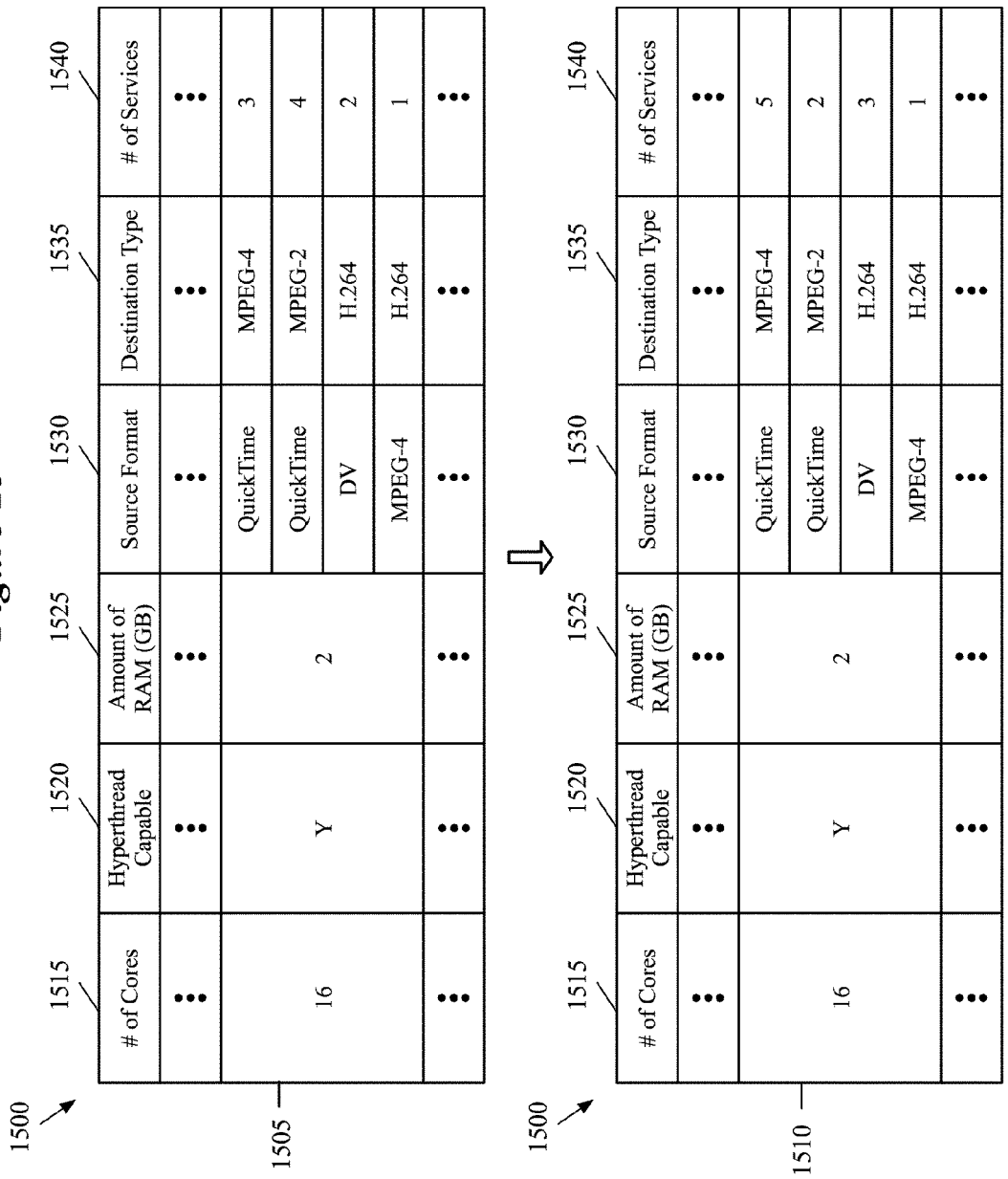
FIG. 15 illustrates an example of the adaptation of a service configuration table of some embodiments to a particular user's electronic device after the device has performed a number of similar operations.

FIG. 15 illustrates an example of the adaptation of a service configuration table 1500 of some embodiments to a particular user's electronic device after the device has performed a number of similar operations. The figure illustrates the table 1500 at two stages 1505 and 1510, before and after the table is adapted using historical performance data.

At the first stage 1505, the table 1500 has the service configuration values with which it was distributed. As mentioned above, these values (shown in column 1540 of the table) may have been determined by a team of engineers based on experimentation and coded into a table distributed with an application or operating system. In this case, the table determines the number of services (e.g., compressord daemons) to instantiate for various encoding operations.

As shown, the service configuration table 1500 includes columns 1515-1535 that include different parameters, as well as a column 1540 for the number of services. Illustrating the table as a set of columns is a conceptual representation, as some embodiments store the table as an XML file or other similar data structure. In addition, some embodiments only store the operation parameters in the table (e.g., as described by reference to FIG. 7 above), and perform additional calculations based on the device parameters after retrieving information from the table.

In table 1500, the parameter columns 1515-1525 include columns for the number of processor cores, whether the processors in the device are hyperthread capable, the amount of physical memory (i.e., RAM) available to the device, which are all aspects of the device performing the operations. FIG. 15 illustrates a portion of the table 1500 applicable to a specific device that has 16 cores, is hyperthread capable, and has 2 GB of RAM. The parameter columns 1530 and 1535 include the operation parameters, which in this case are the source format and destination type for encoding operations. The portion of the table illustrated in this figure shows four different operations: QuickTime to MPEG-4, QuickTime to MPEG-2, DV to H.264, and MPEG-4 to H.264. One of ordinary skill in the art will recognize that many different types of encode (or transcode) operations beyond those shown in this figure are possible, and that in some embodiments, the table might include additional parameters (e.g., destination format and encoding scheme).

The column 1540 indicates service configurations (i.e., the number of services) for each different operation. In this case, QuickTime to MPEG-4 uses three services, QuickTime to MPEG-2 uses four services, DV to H.264 uses two services, and MPEG-4 to H.264 uses only one service.

The second stage 1510 illustrates the service configuration table 1500 after a number of encoding operations have been performed by a device on which the table 1500 is stored (e.g., a device running the media-editing application of which the table is a part). As described, after a particular device has performed a number of similar encoding operations (e.g., operations from the same row in table 1500), the system of some embodiments tailors the service configuration table to the particular device so that the table stores a service configuration for performing such operations that provides the optimal performance on the particular device. The system fine-tunes the service configuration table by using data gathered from the performance of the similar encoding operations, which, as shown in FIG. 14, may be stored in a historical performance database or similar data structure.

In the case of table 1500, the number of services for performing a QuickTime to MPEG-4 operation has increased from 3 to 5, the number of services for performing a QuickTime to MPEG-2 operation has decreased from 4 to 2, the number of services for performing a DV to H.264 operation has increased from 2 to 3, and the number of services for performing a MPEG-4 to H.264 operation has remained the same. Having some service configurations increase while others decrease might be due to luck in having different additional applications (e.g., word processors, graphics-intensive video games, etc.) running while the device performs the different operations in the table, by certain aspects of the device that make specific operation types more efficient, or other factors.

The table 1500 illustrated at stage 1510 may not be the final status for service configuration table. The system of some embodiments modifies the service configuration table in an ongoing manner. For instance, as a device becomes older, its performance will often slow down (e.g., to more applications running regularly and using up memory, fragmented system files, etc.), and some embodiments modify the service configuration table to account for such degradation based on the slower performance of the operations in the table (e.g., by decreasing the number of services for performing certain operations). In some embodiments, when the table has not changed for a particular amount of time (or a particular number of operations), the system will stop using the historical performance data to update the table, or will perform such updates less regularly.

Figure 16:
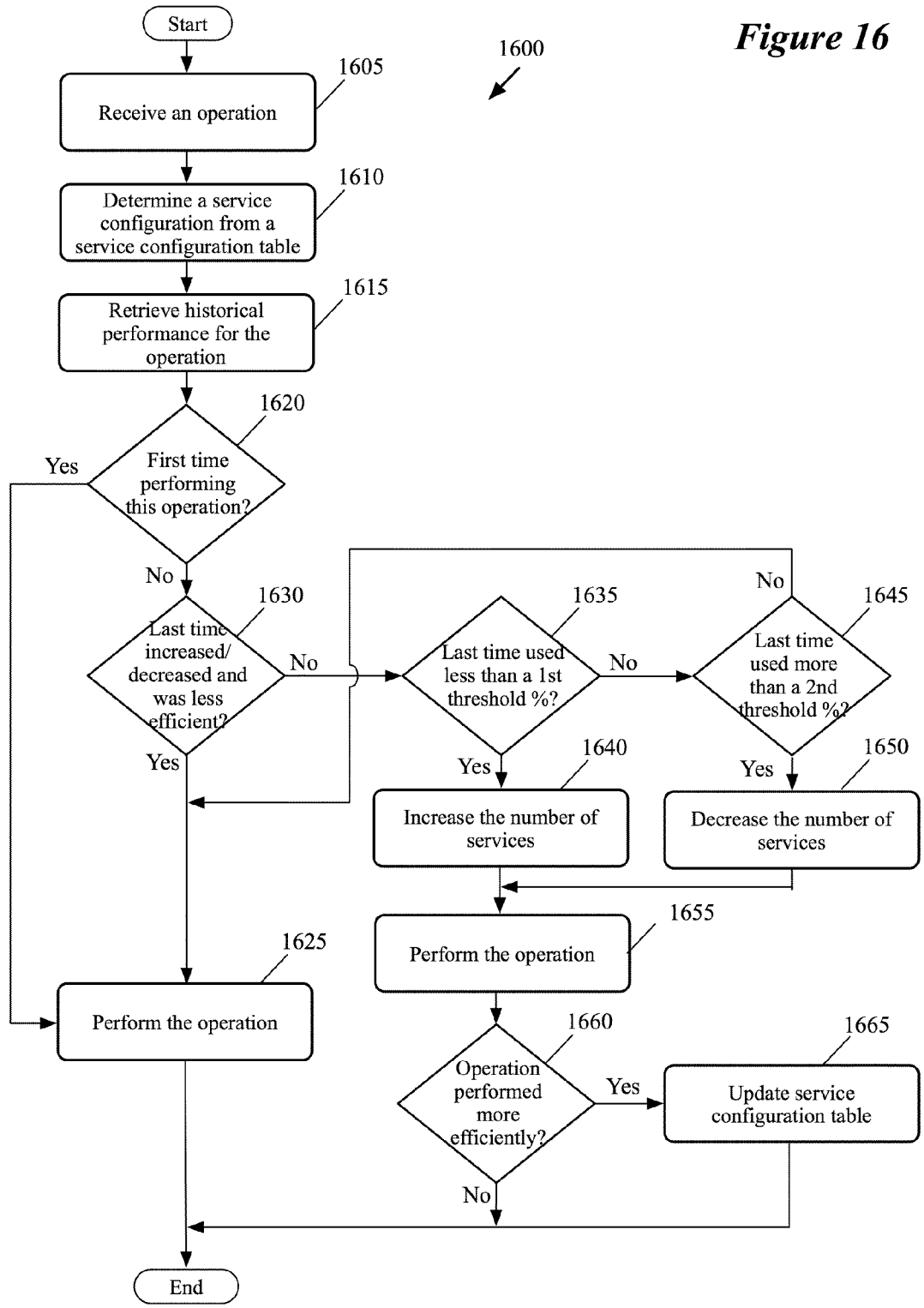
FIG. 16 conceptually illustrates a process of some embodiments for performing an operation and adapting a service configuration table for performing the operation on a particular electronic device in order to obtain the best performance on the particular device.

FIG. 16 conceptually illustrates a process 1600 of some embodiments for performing an operation and adapting a service configuration table for performing the operation on a particular electronic device in order to obtain the best performance on the particular device. The process 1600 will be described by reference to FIG. 17, which illustrates in seven different stages 1705-1735 an example of the adaptation of a service configuration table upon the sequential performance of two similar operations.

The process 1600 begins by receiving (at 1605) an operation (e.g., an encoding operation such as those shown in table 1500 of FIG. 15). This may be the first time such an operation has been performed by the device on which process 1600 operates, or the operation may have been performed numerous times.

Next, the process determines (at 1610) a service configuration (e.g., number of services) from a service configuration table for the operation. As described above, some embodiments may determine the service configuration using a service configuration table by mapping a set of parameters (e.g., hardware configuration and operation parameters) to a service configuration (e.g., a number of services). Some embodiments may use a service configuration table such as table 1500. The service configuration may be determined directly from the service configuration table, or after additional calculations (e.g., using hardware resource parameters).

The process 1600 retrieves (at 1615) historical performance for the operation. In some embodiments, the historical performance database stores various data regarding each operation performed by the system. This data may include, for each operation performed, the number of services used, the percentage of available resources utilized by the services, the efficiency with which the services performed the operation (e.g., the ratio of the amount of data operated on to the duration required to perform the operation), etc. Some embodiments may include additional detailed data, such as whether particular services using particular processor cores performed their sub-operations more slowly or quickly.

The process 1600 then determines (at 1620) whether the received operation has previously been performed by the system (i.e., whether an operation of the same type as the received operation has been performed). Some embodiments use the historical performance data to determine whether the system has previously performed such an operation. When the system has not previously performed such an operation, the historical performance will not have any data stored for the operation.

When the process 1600 determines that this is the system's first time in processing such an operation, the process performs (at 1625) the operation with the service configuration determined at 1610. As described above, the system of some embodiments may perform the operation by instantiating the determined number of services, dividing the operation into sub-operations and distributing the sub-operations to the instantiated services for processing. The process then ends.

Figure 17:
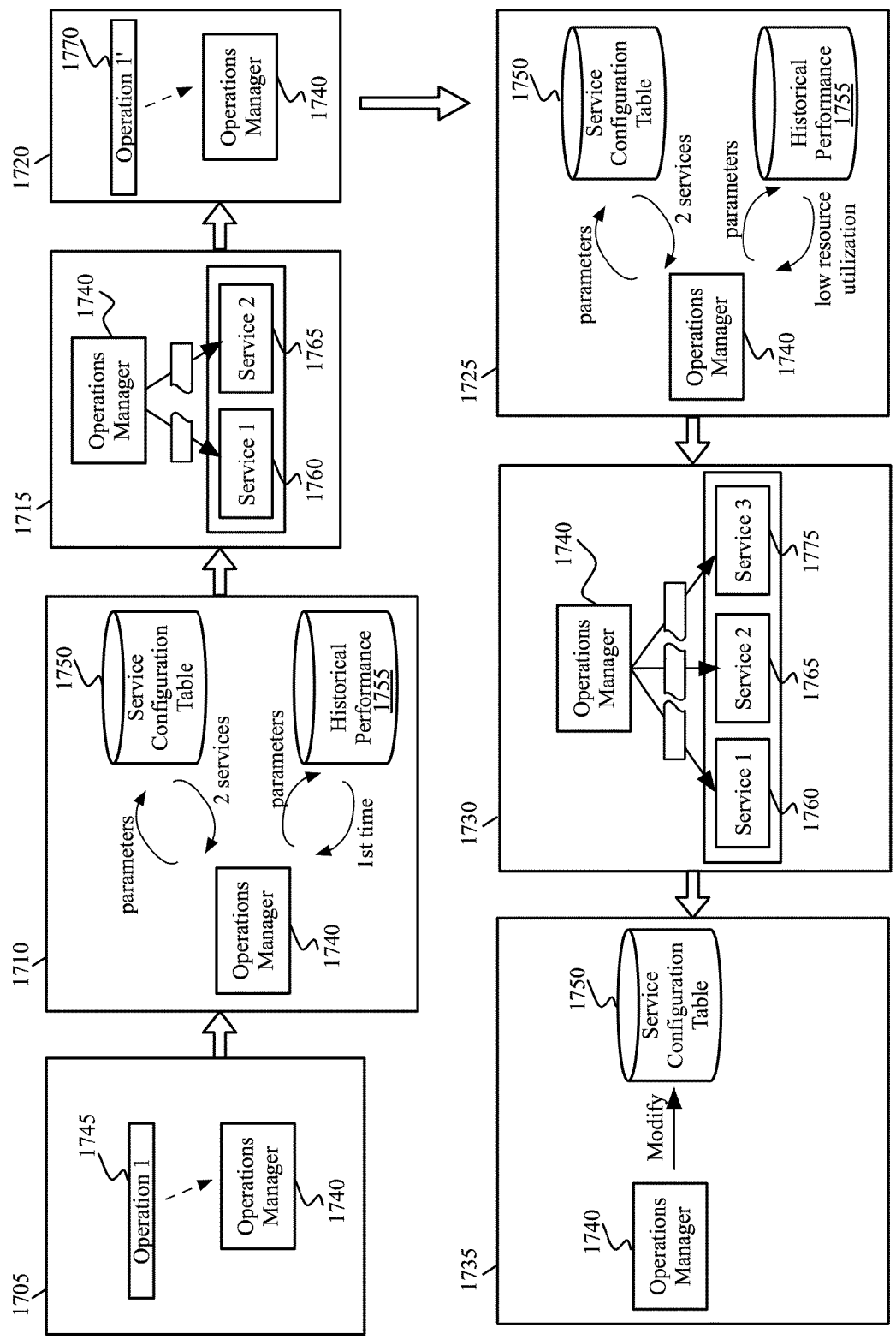
FIG. 17 illustrates an example of the adaptation of a service configuration table upon the sequential performance of two similar operations.

The first three stages of FIG. 17 illustrate the receipt and performance of an operation that is the first operation of its type performed by a system. The first stage 1705 illustrates an operations manager 1740 receiving an operation 1745. The second stage 1710 illustrates the determination of a service configuration for the operation 1745. Initially, the operations manager 1740 uses a service configuration table 1750 to determine a service configuration that uses two services. The operations manager 1740 then accesses the historical performance data 1755 and determines that no operations of the same type as operation 1745 have been performed previously on the device. In some embodiments, the historical performance data returns no data when an operation is being performed for the first time. In this case, the service configuration determined by using the service configuration table 1750 is not modified.

The third stage 1715 illustrates the creation of the services 1760 and 1765, the division of the operation 1745 into sub-operations, and the distribution of the sub-operations to the services 1760 and 1765 by the operations manager 1740. The services 1760 and 1765 then perform the operation by individually processing the sub-operations, as described in the above sections.

Returning to FIG. 16, if the process 1600 determines that the system has previously performed the received operation, the process determines (at 1630) whether (1) the number of services used the last time the system performed the operation was increased or decreased from the number of services used the time previous to that and (2) that most recent performance of the operation was less efficient than the performance of the operation previous to that.

The system of some embodiments may determine this information using the historical performance data. For instance, the historical performance data may include information about the two most recent performances of the operation, which the operations manager can compare. The operations manager can compare the number of services for the two performances of the operations as well as the hardware usage statistics and performance speed (e.g., for video encoding, the completion speed per image).

For example, the historical performance database may indicate that the last time the system performed the operation used 4 services and took 4 minutes to encode 10 minutes of video. The historical performance database may also indicate that the time previous to that the system used 3 services and took 5 minutes to encode 10 minutes of video. In this case, the process 1600 would determine that the number of services used the last time the operation was performed increased from the time before (i.e., from 3 services to 4) and was more efficient (i.e., encoding 10 minutes of video in 4 minutes rather than 5 minutes).

When the process determines that the service configuration used for the previous performance of the operation was modified, but resulted in a less efficient performance, then the process performs (at 1625) the operation using the service configuration determined at 1610. This makes the assumption that if the system increased the number of services previously and was less efficient, then (i) the system should not try increasing the number of services again and (ii) decreasing the number of services would also be less efficient because, if the system was previously attempting to increase the number of services, then the services were not using up too many resources. A similar assumption can be made if the system had tried to decrease the number of services previously and was less efficient.

When either the service configuration was not modified for the previous operation or the service configuration was modified and more efficient, the process determines (at 1635) whether the previous performance of the operation used lower than a threshold percentage of the system's resources. Some embodiments identify the system resource usage for the previous performance of an operation from the historical performance data, and compare this to the low end of a target range. For instance, if the last performance of the operation used 60% of the available resources and the target range is 70-80%, this is lower than the target range (i.e., 60%<70%). The target range may be a predefined range or specified by a user in some embodiments (e.g., a user specifying that encoding operations should only use 40-50% of a system's memory).

If the system used less than the target percentage of resources the previous time, the process increases (at 1640) the number of services in the service configuration. Some embodiments always increment the number of services by one. However, other embodiments increment by a different fixed number of services, or increase the number by a percentage of the total services (e.g., increase from 20 services to 24 rather than to 21). Some embodiments may increase the number of services based on the percentage of resources used by each service (e.g., if 5 services used 35% of the resources in total and the low end of the target range is 70%, increase the number of services to 10).

If the system did not use less than the target percentage of resources for the previous performance of the operation, the process 1600 determines (at 1645) whether the previous performance of the operation used higher than a threshold percentage of the system's resources. Some embodiments identify the system resource usage for the previous performance of an operation from the historical performance data, and compare this to the high end of a target range. For instance, if the last performance of the operation used 95% of the available resources and the target range is 70-80%, this is higher than the target range (i.e., 95%>70%). The target range may be a predefined range or specified by a user in some embodiments (e.g., a user specifying that encoding operations should only use 40-50% of a system's memory).

If the system used more than the target percentage of resources the previous time, the process decreases (at 1650) the number of services in the service configuration. Some embodiments always decrement the number of services by one. However, other embodiments decrement by a different fixed number of services, or decrease the number by a percentage of the total services (e.g., decrease from 30 services to 25 rather than to 29). Some embodiments may decrease the number of services based on the percentage of resources used by each service (e.g., if 11 services used 99% of the resources in total and the high end of the target range is 80%, decrease the number of services to 8).

When the previous performance of the operation used a percentage of resources within the target range, the process proceeds to 1625 to perform the received operation as described above, without modifying the service configuration, then ends. When either increasing or decreasing the number of services in the service configuration, the process performs (at 1655) the received operation using the modified service configuration. In some embodiments, operations 1625 and 1655 involve the same function call or set of function calls to instantiate the designated number of services, divide the operation into sub-operations, and distribute the sub-operations to the instantiated services, but are separated in the conceptual illustration of process 1600 because after operation 1655 the process proceeds to 1660 whereas after operation 1625 the process ends.

After performing the received operation at 1655, the process 1600 determines (at 1660) whether the operation was performed more efficiently with the modified number of services. Some embodiments make this determination by comparing the efficiency (e.g., speed per unit of data) of performing the current operation with the efficiency for previous times performing similar operations from the historical performance data.

If the process 1600 determines that the operation was performed more efficiently this time, then the process updates (at 1665) the service configuration table with the modified service configuration for the particular type of operation. In some embodiments, the system updates the service configuration table by replacing the corresponding entry in the service configuration table with the new number of services used to perform the operation. In some embodiments, values used in the calculation of the number of services may be modified (e.g., the maximum number of instances, service core utilization, amount of memory used per service, etc.).

On the other hand, when the operation is not performed more efficiently, the process ends without updating the service configuration table. Some embodiments also ensure that the hardware resource usage falls within the target range before updating the service configuration table. For example, if the target range is 70-80% resource usage, and the modified service configuration was more efficient in terms of completion speed but usage increased to 85%, some embodiments will not modify the service configuration table because of the concern that too much of the resources are being used.

The fourth through seventh stages 1720-1735 of FIG. 17 illustrate the receipt and performance of a subsequent operation by the operations manager 1740. The fourth stage 1720 illustrates the operations manager 1740 receiving an operation 1770 that is similar to operation 1745 (e.g., is the same type of video encoding operation).

The fifth stage 1725 illustrates the determination of a service configuration for the operation 1770. Initially, the operations manager 1740 uses a service configuration table 1750 to determine a service configuration that uses two services. The operations manager 1740 then accesses the historical performance data 1755 and determines that one previous similar operation has been performed and that less than a target range of resources were utilized in the performance of the operation. As this is only the second time performing the particular operation, the system could not have increased or decreased the number of services the previous time, so process 1600 would check whether the resource utilization was too low or high.

In this case, the resource utilization was below the target range, so the sixth stage 1730 illustrates the creation of three services 1760, 1765, and 1775 by the operations manager 1740 (in this case, using two services already instantiated from the previous operation that had not yet timed out). The sixth stage 1730 also illustrates that the operations manager 1740 has divided the operation 1770 into three sub-operations and distributed these sub-operations to the services 1760, 1765, and 1775. The services 1760, 1765, and 1775 then perform the operation by individually processing the sub-operations, as described in the above sections.

The seventh stage 1735 illustrates the operations manager 1740 updating the service configuration table 1750 so that the next time an operation like 1745 or 1770 is received, the service configuration will specify three services rather than two. In this case, the three services 1760, 1765, and 1775 performed operation 1770 more efficiently than the two services 1760 and 1765 performed operation 1745, without exceeding the target range for resource usage.

One of ordinary skill in the art will recognize that FIG. 16 conceptually illustrates only one of many possible processes used to adapt a service configuration table of some embodiments. For example, some embodiments do not only base service configuration modification decisions on the previous one or two times an operation is performed, but instead look at the entire history of performance data for that operation or a subset of the data. Some embodiments will only begin to modify the service configuration for an operation after an operation has been performed a particular number of times (e.g., 5, 10, 50, etc.), and will perform various statistical calculations on the historical data.

For instance, if a particular operation is performed five times by six services that use 75% of the physical memory four of those times and 99% once, then some embodiments will determine that the 99% is an anomaly and continue using six services. On the other hand, if four of the next five times the operation is performed the six services use 99% of the physical memory, then some embodiments will begin decreasing the number of services. As another example, if the target usage range is 70-80%, and using four services regularly causes 65% utilization while five services regularly causes 85% utilization, some embodiments will settle on either four or five services rather than switching back and forth. Some embodiments will prefer four services, favoring lower utilization rather than higher utilization, while some embodiments will use whichever service configuration results in more efficient processing speed.

Figure 18:
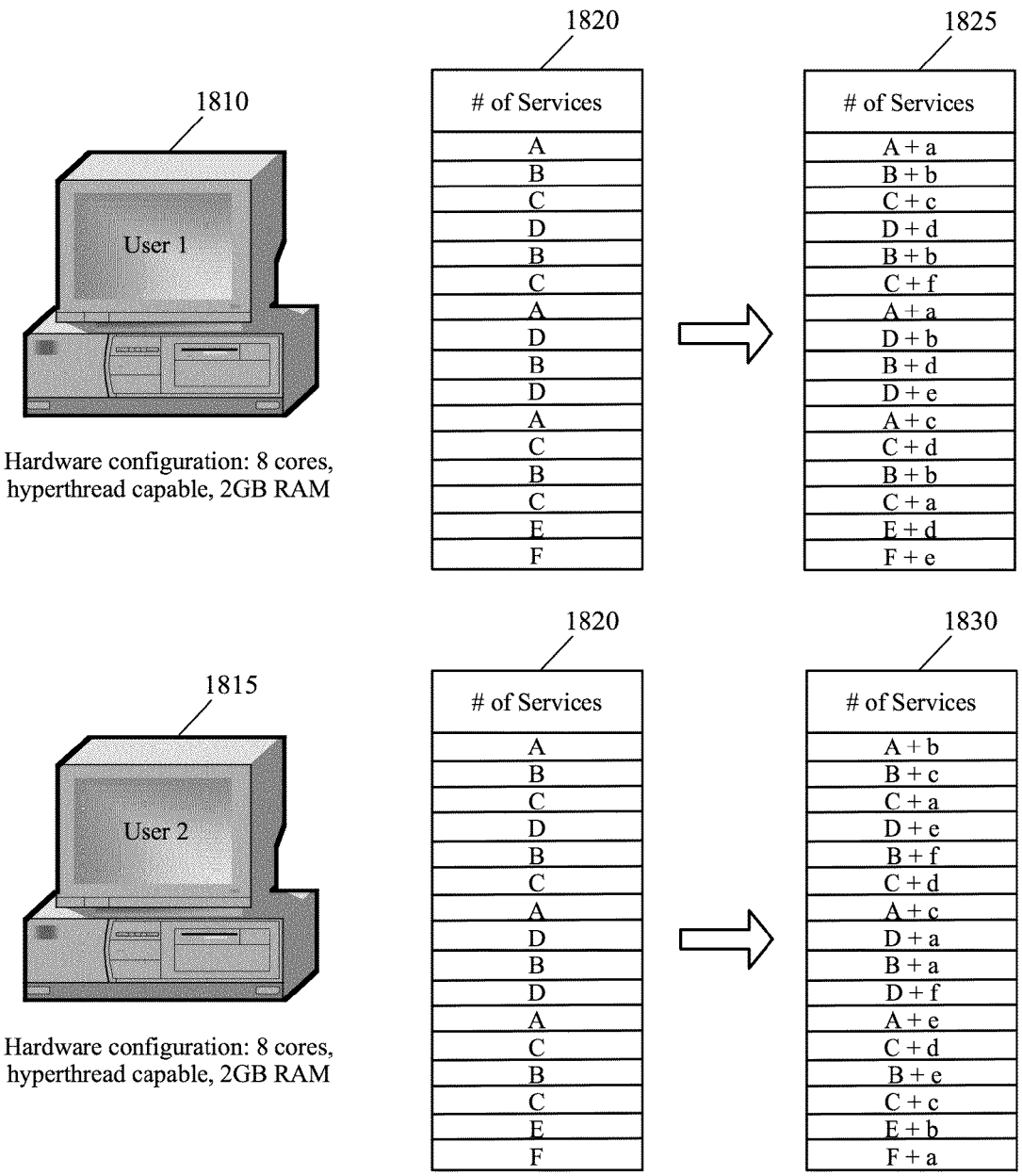
FIG. 18 illustrates an example of two electronic devices with the same hardware configuration whose service configuration tables start at the same initial table but evolve differently.

Because two different devices might have different efficiency in performing the same type of operation (e.g., because of different usage patterns, different hardware quality, etc.), service configuration tables on two different devices with the same hardware configuration might evolve differently in some embodiments. FIG. 18 illustrates an example of two electronic devices with the same hardware configuration whose service configuration tables start at the same initial table but evolve differently (e.g., by application of process 1600 or a similar process).

As shown, two computers 1810 and 1815 with the same hardware configuration (e.g., same number of cores, hyperthread capability, amount of RAM, etc.) initially have the same service configuration table 1820 (e.g., upon installation of an operating system or application). However, after a particular period of time, the modified service configuration table 1825 for computer 1810 is different than the modified service configuration table 1830 for computer 1815.

These differences may be the result of various factors. Since different users use their computing devices differently (e.g., by running different types of programs for different durations and with different regularity), the computing resources that are available for performing different operations vary from one device to the next. Additionally, aspects of the hardware configuration that are not taken into account in the service determination configuration may affect the performance of an operation (e.g., whether the hard disk is nearly full, the quality of the hardware, etc.). Therefore, by analyzing historical performances of similar operations as described above, each computing device may fine-tune its service configuration table to one that best suits the conditions most commonly experienced on that device.

IV. Software Architecture

Figure 19:
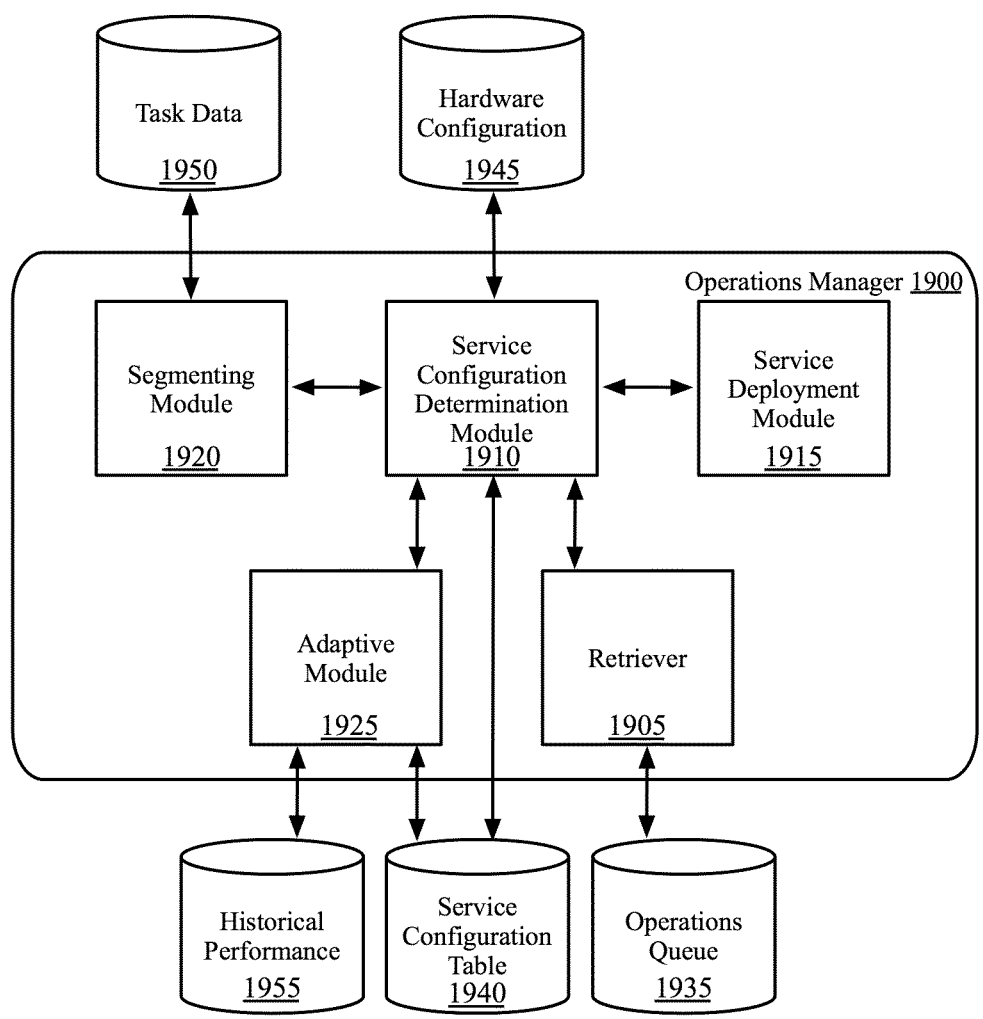
FIG. 19 conceptually illustrates the software architecture of an operations manager of some embodiments.

In some embodiments, the processes described above are implemented as software running on a particular machine, such as a computer or a handheld device, or stored in a machine readable medium. FIG. 19 conceptually illustrates the software architecture of an operations manager 1900 of some embodiments. In some embodiments, the operations manager 1900 is a stand-alone application or is integrated into another application (e.g., a media-editing application or a project distribution application such as QMaster®), while in other embodiments the operations manager might be implemented within an operating system. Furthermore, in some embodiments, the operations manager is provided as part of a server-based solution. In some such embodiments, the application is provided via a thin client. That is, the operations manager runs on a server while a user interacts with the operations manager (or the application into which it is integrated) via a separate machine remote from the server. In other such embodiments, the operations manager is provided via a thick client. That is, the operations manager (or the application into which it is integrated) is distributed from the server to the client machine and runs on the client machine.

The operations manager 1900 includes a retriever 1905, a service configuration determination module 1910, a service deployment module 1915, a segmenting module 1920, and an adaptive module 1925. In addition, FIG. 19 illustrates an operations queue 1935, a service configuration table 1940, a hardware configuration 1945, task data 1950, and historical performance data 1955.

In some embodiments, the operations queue 1935 stores the operations to be performed on an electronic device or devices. Some embodiments enable a user of an electronic device to specify operations (e.g., create a DVD, upload a video presentation to YouTube®, convert a file, etc.) through a user interface of a media-editing application that is on the device. In some embodiments, an operation may be an encoding project that converts video from one format to a second format. Some embodiments receive a task (e.g., create a DVD from a presentation) and break the task into several different operations that are placed in the operations queue 1935 as a batch.

The service configuration table 1940 stores a lookup table (e.g., as an XML file) that the operations manager 1900 uses to determine a service configuration for a particular operation. The system of some embodiments maps a set of parameters (e.g., including properties of an operation as well as hardware resource statistics) to a service configuration for performing the particular operation. In some embodiments, the service configuration specifies the number of services to instantiate for the particular operation. In other embodiments, the service configuration may provide a service's core utilization (e.g., how many cores each service uses) and the maximum number of services to run on a system. The system of some embodiments may then compute the number of services using those values.

The hardware configuration 1945 stores information about the hardware resources (e.g., number of cores, amount of physical memory, processing speed, etc.) available to the operations manager 1900 for performing the operations in the operations queue 1935. This may be the overall static hardware resources of the electronic device (or devices, if in a cluster) performing the operations or the subset of those hardware resources that are available at a particular moment in time. In some embodiments, the operating system of the device (or devices) used to perform the operations keeps track of the hardware configuration.

The task data 1950 is the data upon which the operation (or operations) is to be performed. For a video encoding operation, the task data is the unencoded video (i.e., either decoded video or video encoded in a format other than the destination format). In some embodiments, the task data 1950 stores the segments of media data that are distributed to different services for processing.

The historical performance data 1955 stores information relating to the previous performance of operations managed by the operations manager (e.g., as a lightweight database). This data may include the number of times the operations manager has performed a particular type of operation. In addition, for each performance of the operation, the historical performance data 1955 may include the number of services used, the percentage of available resources utilized by each of the services, the time taken to perform the operation, etc. Some embodiments use the historical performance data 1955 to modify the service configuration table 1940.

In some embodiments, the data stored in storages 1935-1955 are all stored in one physical storage (e.g., a hard disk, RAM, etc.). In other embodiments, the various data are stored in separate physical storages (e.g., different types of storages, different disks, etc.), or more than one type of data are stored in one physical storage while the others are in different physical storages. In addition, one or more of the sets of data might be spread across multiple physical storages (e.g., task data 1950 stored on multiple disk drives including shared network drives).

In some embodiments, the retriever 1905 of the operations manager 1900 retrieves one or more operations (e.g., encoding projects) from the operations queue 1935. Some embodiments allow the retriever 1905 to retrieve an operation from the queue 1935 only when no other operations are currently in progress. In other embodiments, the operations manager 1900 can judge the available resources and determine whether to retrieve the next operation. Upon retrieving an operation, the retriever 1905 identifies parameters for the operation (e.g., the source format and the destination format for a video encoding operation, etc.) and passes the operation parameters (and additional data describing the operation, such as the location of the source data to use for the operation) to the service configuration determination module 1910.

The service configuration determination module 1910 determines a service configuration for an operation. The service configuration determination module 1910 receives the operation parameters from the retriever 1905 and retrieves the hardware configuration data 1945 (e.g., by querying an operating system) and maps the set of parameters to a particular service configuration using the service configuration table 1940. In some embodiments, the service configuration table 1940 provides a service's core utilization and maximum number of services (e.g., as shown in FIG. 7). The service configuration determination module 1910 may then use the values provided by the service configuration table 1940 to compute the number of services to instantiate for the operation. In some embodiments, the service configuration determination module 1910 uses the adaptive module 1925 to further refine the number of services to instantiate for the operation. The service configuration determination module 1910 then passes the number of services to instantiate to the service deployment module 1915.

The service deployment module 1915 deploys the number of services specified by the service configuration determination module 1910. In some cases, the service deployment module 1915 instantiates all new services. However, the service deployment module 1915 of some embodiments detects whether there are services that are already operational, and uses these if possible. If the number of services received from the service configuration determination module 1910 is greater than the number of currently operational services, then the service deployment module 1915 instantiates the additional services needed. If the number of services received from the service configuration determination module 1910 is the same or less than the currently operational services, then the service deployment module 1915 does not instantiate any additional services.

The segmenting module 1920 segments task data 1950 into sub-portions for distribution to services for processing. In some embodiments, the segmenting module 1920 receives the service configuration (e.g., the number of services for an operation) from the service configuration determination module 1910 and segments the task data 1950 evenly according to the service configuration. Some embodiments segment the task data 1950 into the same number as the number of services that are instantiated for performing an operation. The segmenting module 1920 of some embodiments segment the task data 1950 into a multiple (e.g., twice, three times) of the number of services instantiated for performing the operation.

In some embodiments, the segmenting module 1920 determines the number of sub-portions into which to segment the task data 1950 by communicating with at least one of the operational services. The service may specify whether an operation can be segmented, and if so, the number of sub-operations into which the operation should be segmented. If the service specifies that an operation cannot be segmented, then the segmenting module 1920 will not segment the task data 1950 and allow one service to perform the operation. When the service specifies that an operation should be segmented, the segmenting module 1920 divides the task data into the number of segments specified by the service. In the case of video encoding, some embodiments segment the video data into segments having an equal (or near-equal) number of video images (i.e., frames or fields). Upon segmentation of the task data 1950, the segmenting module 1920 distributes the segments to the services for processing.

The adaptive module 1925 modifies the service configuration based on historical performance data 1955 and updates the service configuration table 1940 if necessary. In some embodiments, the adaptive module 1925 receives a service configuration and operation information from the service configuration determination module 1910 and modifies the service configuration (e.g., number of services to instantiate for performing an operation) before the service deployment module 1915 deploys the services for the operation. To determine whether to modify the service configuration, the adaptive module 1925 retrieves historical performance data 1955 about the particular type of operation and analyzes the past performance of the operation (e.g., as described above in Section III). If the operation might be performed more efficiently with fewer or more services than are specified by the service configuration, the adaptive module 1925 modifies the service configuration (or tells the service configuration determination module 1910 to modify the service configuration).

The service configuration determination module 1910 then sends this new service configuration to the service deployment module 1915 for service deployment.

After the various services perform the operation (whether or not the service configuration is modified by the adaptive module 1925), the adaptive module 1925 stores the performance data for the recently performed operation in the historical performance data 1955. In some embodiments, resource usage information may be retrieved from the operating system of the device performing the operation. In addition, if the operation was performed more efficiently with a modified service configuration, the adaptive module 1925 may modify the appropriate entry in the service configuration table 1940.

While many of the features have been described as being performed by one module (e.g., the service configuration determination module 1910, the adaptive module 1925, etc.), one of ordinary skill will recognize that the functions described herein might be split up into multiple modules. Similarly, functions described as being performed by multiple different modules might be performed by a single module in some embodiments (e.g., the adaptive module 1925 and the retriever 1905 could be part of the service configuration determination module 1910). In addition, some embodiments might include additional or different modules (e.g., some embodiments might not include an adaptive module and would not track the historical performance data).

V. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 20:
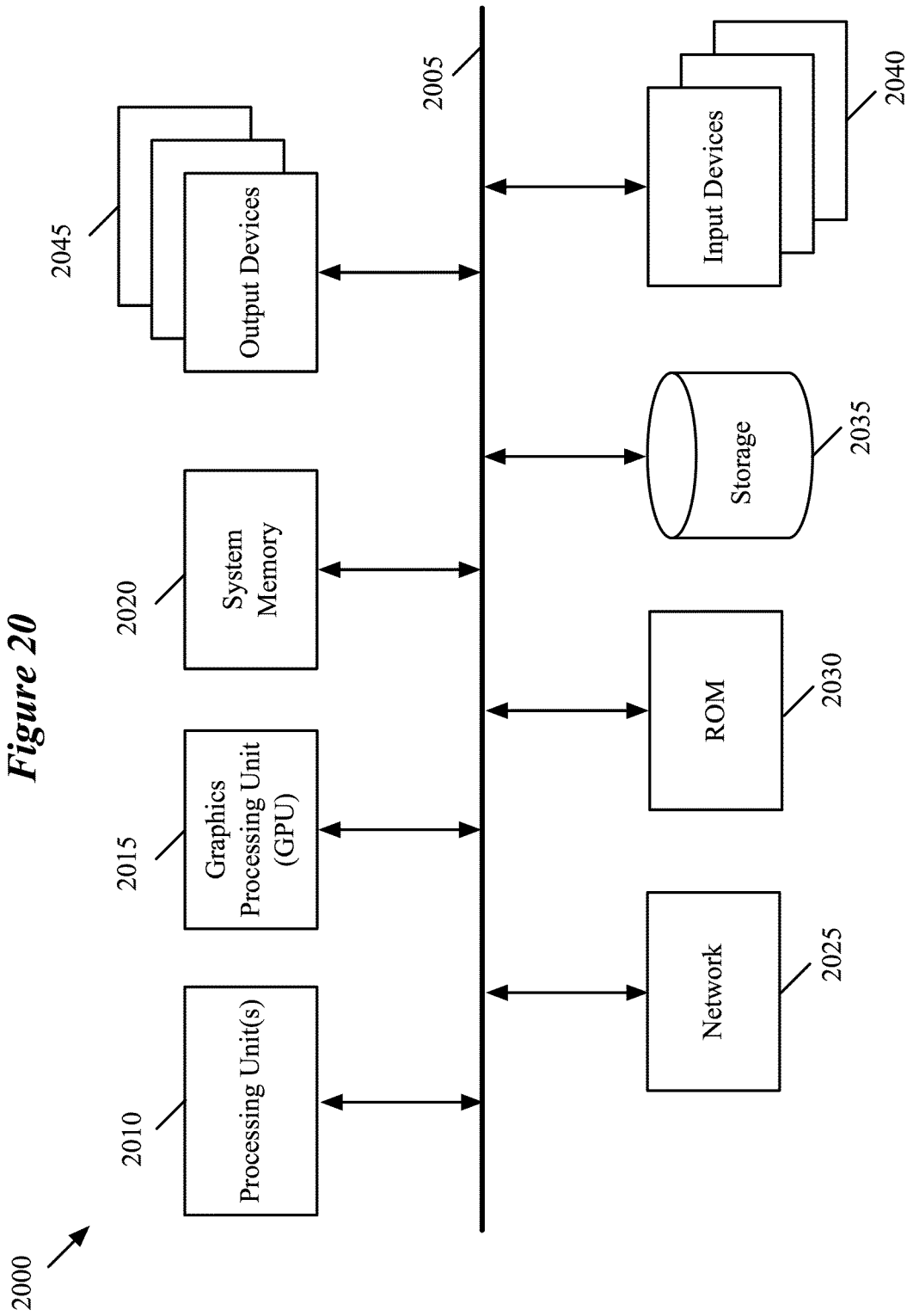
FIG. 20 conceptually illustrates an electronic system with which some embodiments of the invention are implemented.

FIG. 20 conceptually illustrates an electronic system 2000 with which some embodiments of the invention are implemented. The electronic system 2000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2000 includes a bus 2005, processing unit(s) 2010, a graphics processing unit (GPU) 2015, a system memory 2020, a network 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the read-only memory 2030, the GPU 2015, the system memory 2020, and the permanent storage device 2035.

From these various memory units, the processing unit(s) 2010 retrieves instructions to execute and data to process in order to execute the processes of the invention. The processing unit(s) may be a single processor or a multi-core processor in different embodiments. Some instructions are passed to and executed by the GPU 2015. The GPU 2015 can offload various computations or complement the image processing provided by the processing unit(s) 2010. In some embodiments, such functionality can be provided using CoreImage's kernel shading language.

The read-only-memory (ROM) 2030 stores static data and instructions that are needed by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the invention use a mass-storage device (such as a magnetic or optical disk and its corresponding disk drive) as the permanent storage device 2035.

Other embodiments use a removable storage device (such as a floppy disk, flash drive, or ZIP® disk, and its corresponding disk drive) as the permanent storage device. Like the permanent storage device 2035, the system memory 2020 is a read-and-write memory device. However, unlike storage device 2035, the system memory 2020 is a volatile read-and-write memory, such a random access memory. The system memory 2020 stores some of the instructions and data that the processor needs at runtime. In some embodiments, the invention's processes are stored in the system memory 2020, the permanent storage device 2035, and/or the read-only memory 2030. For example, the various memory units include instructions for processing multimedia clips in accordance with some embodiments. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alphanumeric keyboards and pointing devices (also called "cursor control devices"). The output devices 2045 display images generated by the electronic system. The output devices 2045 include printers and display devices, such as cathode ray tubes (CRT) or liquid crystal displays (LCD). Some embodiments include devices such as a touchscreen that function as both input and output devices.

Finally, as shown in FIG. 20, bus 2005 also couples electronic system 2000 to a network 2025 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 10, and 16) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory machine readable medium storing a program which when executed by at least one processing unit of a particular physical machine having a plurality of processing units distributes an operation for processing by a set of background services, the program comprising sets of instructions for:

maintaining a service configuration table comprising a mapping of operation properties and hardware resources to a number of processing units used by each background service and a maximum number of background services for performing the operation;

detecting a set of the hardware resources of the particular physical machine and a set of properties for the operation;

performing a lookup on the service configuration table using the detected set of the hardware resources and the detected set of the properties for the operation in order to calculate a number of background services to instantiate to perform the operation;

instantiating the calculated number of background services on the particular physical machine, each of the background services utilizing a different one or more of the processing units of the particular physical machine;

partitioning the operation into a number of sub-operations that is larger than the number of background services;

initially distributing one sub-operation to each instantiated background service on the particular physical machine; and each time a particular background service completes a sub-operation, distributing one undistributed sub-operation to the particular background service until all of the sub-operations are distributed.

2. The non-transitory machine readable medium of claim 1, wherein the program further comprises a set of instructions for communicating with at least one of the instantiated background services to determine the number of sub-operations into which to partition the operation.

3. The non-transitory machine readable medium of claim 1, wherein the operation is a first operation and the calculated number of background services is a first number, wherein the program further comprises sets of instructions for automatically determining a second number of background services for a second operation after completing the first operation.

4. The non-transitory machine readable medium of claim 3, wherein the program further comprises a set of instructions for instantiating additional background services when the second number of background services is greater than the first number of background services.

5. The non-transitory machine readable medium of claim 1, wherein each background service is a different instantiation of a same particular service program.

6. A method comprising:

maintaining a service configuration table comprising a mapping of operation properties and hardware resources to a number of processor cores used by each background service and a maximum number of background services for performing an operation;

detecting a set of hardware resources of an electronic device and a set of properties for the operation;

performing a lookup on the service configuration table using the detected set of the hardware resources and the detected set of the properties for the operation in order to calculate an initial number of background services to instantiate to perform the operation;

retrieving historical performance data that indicates the efficiency of a last performance of the operation in comparison to previous performances that used different numbers of background services;

when the historical performance data indicates that the last performance is inefficient compared to previous performances and the last performance used less than a threshold percentage of the electronic device's hardware resources, increasing the number of background services to instantiate to more than the initial number; and instantiating the determined number of background services on the electronic device.

7. The method of claim 6, wherein detecting the set of hardware resources comprises detecting at least one of available physical memory of the electronic device and whether the electronic device is hyperthread capable.

8. The method of claim 6, wherein the operation is a video encoding operation that encodes a sequence of video images using a particular encoding scheme, wherein the operation properties comprise a source format of the operation and a destination format of the operation.

9. The method of claim 6 further comprising decreasing the number of background services to instantiate to less than the initial number when the historical performance data indicates that the last performance is inefficient compared to previous performances and the last performance used more than a different threshold percentage of the electronic device's hardware resources.

10. The method of claim 6 further comprising modifying the service configuration table when the performance of the operation with the calculated number of background services is more efficient than the last performance of the operation.

11. A non-transitory machine readable medium storing a program which when executed by at least one processing unit performs a computing operation on a single electronic device, the program comprising sets of instructions for:
  maintaining a service configuration table comprising a mapping of operation properties and hardware resources to a number of processing units used by each background service and a maximum number of background services for performing a particular operation;
  detecting a set of the hardware resources of the single electronic device and a set of properties for the particular operation;
  performing a lookup on the service configuration table using the detected set of the hardware resources and the detected set of the properties for the particular operation in order to calculate an initial number of background services to instantiate to perform the particular operation;
  modifying the initial number of background services based on hardware resources currently available to the single electronic device;
  instantiating the modified number of background services on the single electronic device;
  segmenting the particular operation into a plurality of sub-operations; and
  distributing the plurality of sub-operations to the instantiated background services for processing by different processing units of the single electronic device.

12. The non-transitory machine readable medium of claim 11, wherein the set of instructions for detecting the set of hardware resources comprises a set of instructions for detecting at least one of available physical memory of the electronic device, a number of processing units on the single electronic device, and whether the electronic device is hyperthread capable.

13. The non-transitory machine readable medium of claim 11, wherein the particular operation comprises a video encoding operation that encodes a video having a particular duration, wherein the set of instructions for segmenting the particular operation comprises a set of instructions for segmenting the video into a plurality of segments having an approximately equal duration.

14. The non-transitory machine readable medium of claim 11, wherein the particular operation is segmented into a number of sub-operations equal to the modified number of background services and one sub-operation is distributed to each of the instantiated background services.

15. The non-transitory machine readable medium of claim 11, wherein the particular operation is segmented into a number of sub-operations larger than the modified number of background services and the set of instructions for distributing the plurality of sub-operations comprises sets of instructions for:
  initially distributing one sub-operation to each instantiated background service; and
  when a particular background service completes an initially-distributed sub-operation, distributing another sub-operation to the particular background service.

16. The non-transitory machine readable medium of claim 11, wherein the particular operation is a first operation, the program further comprising a set of instructions for automatically determining an additional number of background services for a second operation that is an operation of a same particular type by using data regarding efficiency of performing the first operation.

17. A method for performing a particular type of operation, the method comprising:
  maintaining a service configuration table comprising a mapping of operation properties and hardware resources to a number of processing units used by each background service and a maximum number of background services for performing an operation of the particular type;
  detecting a set of the hardware resources of the particular physical machine and a set of properties for the operation;
  performing a lookup on the service configuration table using the detected set of the hardware resources and the detected set of the properties for the operation in order to calculate an initial number of background services to instantiate to perform the operation;
  retrieving historical performance data about the particular type of operation that comprises statistics regarding the efficiency and hardware resource usage for performing operations of the particular type;
  modifying the initial number of background services using the historical performance data to determine a modified number of background services;
  performing the operation using the modified number of background services with the set of hardware resources; and
  modifying the service configuration table when the performance of the operation with the modified number of background services with the set of hardware resources is more efficient than a previous performance of a similar operation of the same type using the initial number of background services with the set of hardware resources.

18. The method of claim 17, wherein detecting the set of hardware resources for the particular physical machine comprises detecting at least one of an amount of available physical memory and a number of processor cores.

19. The method of claim 17, wherein modifying the initial number of background services comprises increasing the number of background services when the historical performance data indicates that one or more previous performances of the operation used less than a threshold percentage of available resources.

20. The method of claim 17, wherein modifying the initial number of background services comprises decreasing the number of background services when the historical performance data indicates that one or more previous performances of the particular type of operation used more than a threshold percentage of available resources.

* * * * *